(12) United States Patent
Manula et al.

(10) Patent No.: US 8,484,392 B2
(45) Date of Patent: Jul. 9, 2013

(54) METHOD AND SYSTEM FOR INFINIBAND HOST CHANNEL ADAPTOR QUALITY OF SERVICE

(75) Inventors: Brian Edward Manula, Oslo (NO); Magne Vigulf Sandven, Ski (NO); Haakon Ording Bugge, Oslo (OA); Ola Torudbakken, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 232 days.

(21) Appl. No.: 13/149,449

(22) Filed: May 31, 2011

(65) Prior Publication Data
US 2012/0311597 A1    Dec. 6, 2012

(51) Int. Cl.
*G06F 13/12* (2006.01)
*G06F 13/00* (2006.01)

(52) U.S. Cl.
USPC ............. 710/56; 710/310; 710/22; 718/100; 709/213

(58) Field of Classification Search
USPC .. 710/52–57, 22, 308, 310; 718/100; 709/213
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,904,507 B2 * | 6/2005 | Gil | 711/170 |
| 6,917,987 B2 | 7/2005 | Parthasarathy et al. | |
| 7,016,996 B1 * | 3/2006 | Schober | 710/113 |
| 7,136,353 B2 | 11/2006 | Ha et al. | |
| 7,150,021 B1 * | 12/2006 | Vajjhala et al. | 718/104 |
| 7,330,918 B2 | 2/2008 | Yamamoto et al. | |
| 7,337,446 B2 * | 2/2008 | Sankaranarayan et al. | 719/318 |
| 7,401,126 B2 * | 7/2008 | Pekkala et al. | 709/217 |
| 7,496,698 B2 | 2/2009 | Biran et al. | |
| 7,609,636 B1 | 10/2009 | Mott | |
| 7,620,693 B1 * | 11/2009 | Mott et al. | 709/213 |
| 7,640,544 B2 * | 12/2009 | Flood et al. | 718/100 |
| 7,742,497 B2 | 6/2010 | Ganti et al. | |
| 7,769,015 B2 | 8/2010 | Huang et al. | |
| 7,782,805 B1 | 8/2010 | Belhadj et al. | |

(Continued)

OTHER PUBLICATIONS

Pfister, Gregory; "An Introduction to the Infiniband Architecture"; IBM Enterprise Server Group, Chapter 42, pp. 617-632, (2002).

(Continued)

*Primary Examiner* — Christopher Shin
(74) *Attorney, Agent, or Firm* — Osha Liang LLP

(57) ABSTRACT

A method for allocating resources of a host channel adapter includes the host channel adapter identifying an underlying function referenced in the first resource allocation request received from a virtual machine manager, determining that the first resource allocation request specifies a number of physical collect buffers (PCBs) allocated to the underlying function, allocating the number of PCBs to the underlying function, determining that the first resource allocation request specifies a number of virtual collect buffers (VCBs) allocated to the underlying function, and allocating the number of VCBs to the underlying function. The host channel adapter further receives command data for a command from the single virtual machine, determines that the underlying function has in use at least the number of PCBs when the command data is received, and drops the command data in the first command based on the underlying function having in use at least the number of PCBs.

20 Claims, 11 Drawing Sheets

U.S. PATENT DOCUMENTS

| | | | |
|---|---|---|---|
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,882,505 B2 * | 2/2011 | Garthwaite et al. | 718/104 |
| 7,899,050 B2 | 3/2011 | Craddock et al. | |
| 8,037,529 B1 * | 10/2011 | Chiueh et al. | 726/22 |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 2001/0036185 A1 | 11/2001 | Dempo | |
| 2002/0172195 A1 * | 11/2002 | Pekkala et al. | 370/360 |
| 2003/0101158 A1 | 5/2003 | Pinto et al. | |
| 2004/0064664 A1 * | 4/2004 | Gil | 711/170 |
| 2004/0120332 A1 * | 6/2004 | Hendel | 370/411 |
| 2005/0018669 A1 | 1/2005 | Arndt et al. | |
| 2005/0060443 A1 | 3/2005 | Rosner | |
| 2005/0132374 A1 * | 6/2005 | Flood et al. | 718/100 |
| 2005/0135419 A1 | 6/2005 | Pullen et al. | |
| 2005/0223118 A1 | 10/2005 | Tucker et al. | |
| 2006/0136988 A1 * | 6/2006 | Raja et al. | 726/1 |
| 2007/0008886 A1 | 1/2007 | Chen et al. | |
| 2007/0019665 A1 | 1/2007 | Benveniste | |
| 2007/0165672 A1 | 7/2007 | Keels et al. | |
| 2007/0223472 A1 | 9/2007 | Tachibana et al. | |
| 2007/0223483 A1 | 9/2007 | Huang et al. | |
| 2007/0242686 A1 | 10/2007 | Zegers et al. | |
| 2008/0140984 A1 | 6/2008 | Shearer | |
| 2008/0168194 A1 | 7/2008 | Gregg et al. | |
| 2009/0125604 A1 | 5/2009 | Chang et al. | |
| 2011/0216648 A1 | 9/2011 | Mehrotra et al. | |
| 2012/0239832 A1 | 9/2012 | Subramanian et al. | |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapter 3-6, pp. 31-129 (2003).

Shanley, Tom; "Infiniband Network Architecture", MindShare, Inc., Chapter 13, pp. 259-289 (2003).

* cited by examiner

METHOD AND SYSTEM FOR INFINIBAND HOST CHANNEL ADAPTOR QUALITY OF SERVICE

CROSS-REFERENCE TO RELATED APPLICATIONS

The present application contains subject matter that may be related to the subject matter in the following U.S. patent applications, which are both assigned to a common assignee and are both incorporated by reference in their entirety: "Method and System for Processing Commands on an Infiniband® Host Channel Adapter", "U.S. patent application Ser. No. 13/149,436" filed on May 31, 2011; and "Method and System for Temporary Data Unit Storage on Infiniband® Host Channel Adapter", "U.S. patent application Ser. No. 13/149,483" filed on May 31, 2011.

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

Infiniband® supports operations such as remote direct memory access (RDMA) read and write operation. Specifically, a requested process may send a request in the message for the receiver to store data and/or return data. In response, the remote node's channel adapter includes functionality to store and/or return the requested data to the requesting process.

SUMMARY

In general, in one aspect, the invention relates to a method for allocating resources of a host channel adapter. The method includes the host channel adapter receiving, from a virtual machine manager on a host, a first resource allocation request, identifying an underlying function referenced in the first resource allocation request, where the underlying function corresponds to a single virtual machine located on the host, determining that the first resource allocation request specifies a number of physical collect buffers (PCBs) allocated to the underlying function, allocating the number of PCBs to the underlying function by storing the number in a control and status register (CSR), determining that the first resource allocation request specifies a number of virtual collect buffers (VCBs) allocated to the underlying function, and allocating the number of VCBs to the underlying function by storing a base address register (BAR) in the CSR. The method further includes the host channel adapter receiving first command data for a first command from the single virtual machine for sending packets on a network, wherein the first command data specifies an address of a VCB of the number of VCBs allocated to the single virtual machine, determining, using the CSR, that the underlying function has in use at least the number of PCBs when the first command data is received, and dropping the first command data in the first command based on the underlying function having in use at least the number of PCBs.

In general, in one aspect, the invention relates to a host channel adapter that includes a plurality of physical collect buffers (PCBs), a first control and status register (CSR) corresponding to a first underlying function, where the first underlying function corresponds to a first virtual machine, a second CSR corresponding to a second underlying function, where the second underlying function corresponding to a second virtual machine, and a service processor resource manager operatively connected to the first CSR and the second CSR. The service processor resource manager is configured to receive, from a virtual machine manager on a host, a first resource allocation request, identify the first underlying function referenced in the first resource allocation request, determine that the first resource allocation request specifies a first number of PCBs allocated to the first underlying function, allocate the first number of PCBs to the first underlying function by storing the first number in the first CSR, determine that the first resource allocation request specifies a first number of virtual collect buffers (VCBs) allocated to the first underlying function, allocate the first number of VCBs to the first underlying function by storing a base address register (BAR) in the CSR, receive, from the virtual machine manager on a host, a second resource allocation request, identify the second underlying function referenced in the second resource allocation request, determine that the second resource allocation request specifies a second number of PCBs allocated to the second underlying function, and allocate the second number of PCBs to the second underlying function by storing the second number in the second CSR. The host channel adapter further includes a PCB allocator configured to receive first command data for a first command from the first virtual machine for sending packets on an network, where the first command data specifies an address of a VCB of the first number of VCBs, determine, using the CSR, that the underlying function has in use at least the number of PCBs when the first command data is received, and drop the first command data in the first command based on the underlying function having in use at least the number of PCBs.

In general, in one aspect, the invention relates to a system that includes a host including a virtual machine manager configured to send a first resource allocation request and a second resource allocation request, a first virtual machine, and a second virtual machine. The system further includes a host channel adapter operatively connected to the host and including a plurality of physical collect buffers (PCBs), a first control and status register (CSR) corresponding to a first underlying function, where the first underlying function corresponds to the first virtual machine, a second CSR corresponding to a second underlying function, where the second underlying function corresponding to the second virtual machine, and a service processor resource manager. The service processor resource manager is configured to receive the first resource allocation request, identify the first underlying function referenced in the first resource allocation request, determine that the first resource allocation request specifies a first number of PCBs allocated to the first underlying function, allocate the first number of PCBs to the first underlying function by storing the first number in the first CSR, determine that the first resource allocation request specifies a first number of virtual collect buffers (VCBs) allocated to the first underlying function, allocate the first number of VCBs to the first underlying function by storing a base address register (BAR) in the CSR, receive the second resource allocation request, identify the second underlying function referenced in the second resource allocation request, determine that the second resource allocation request specifies a second number of PCBs allocated to the second underlying function, and allocate the second number of PCBs to the second underlying function by storing the second number in the second CSR. The host channel adapter further includes a PCB allocator configured to receive first command data for a first command from the first virtual machine for sending packets on a network, wherein the first command data specifies an address of a VCB of the first number of VCBs, determine, using the CSR, that the underlying function has in use at least the number of PCBs when the first command data is received, and drop the first command data in the first command based on the underlying function having in use at least the number of PCBs.

Other aspects of the invention will be apparent from the following description and the appended claims.

DETAILED DESCRIPTION

Figure 1:
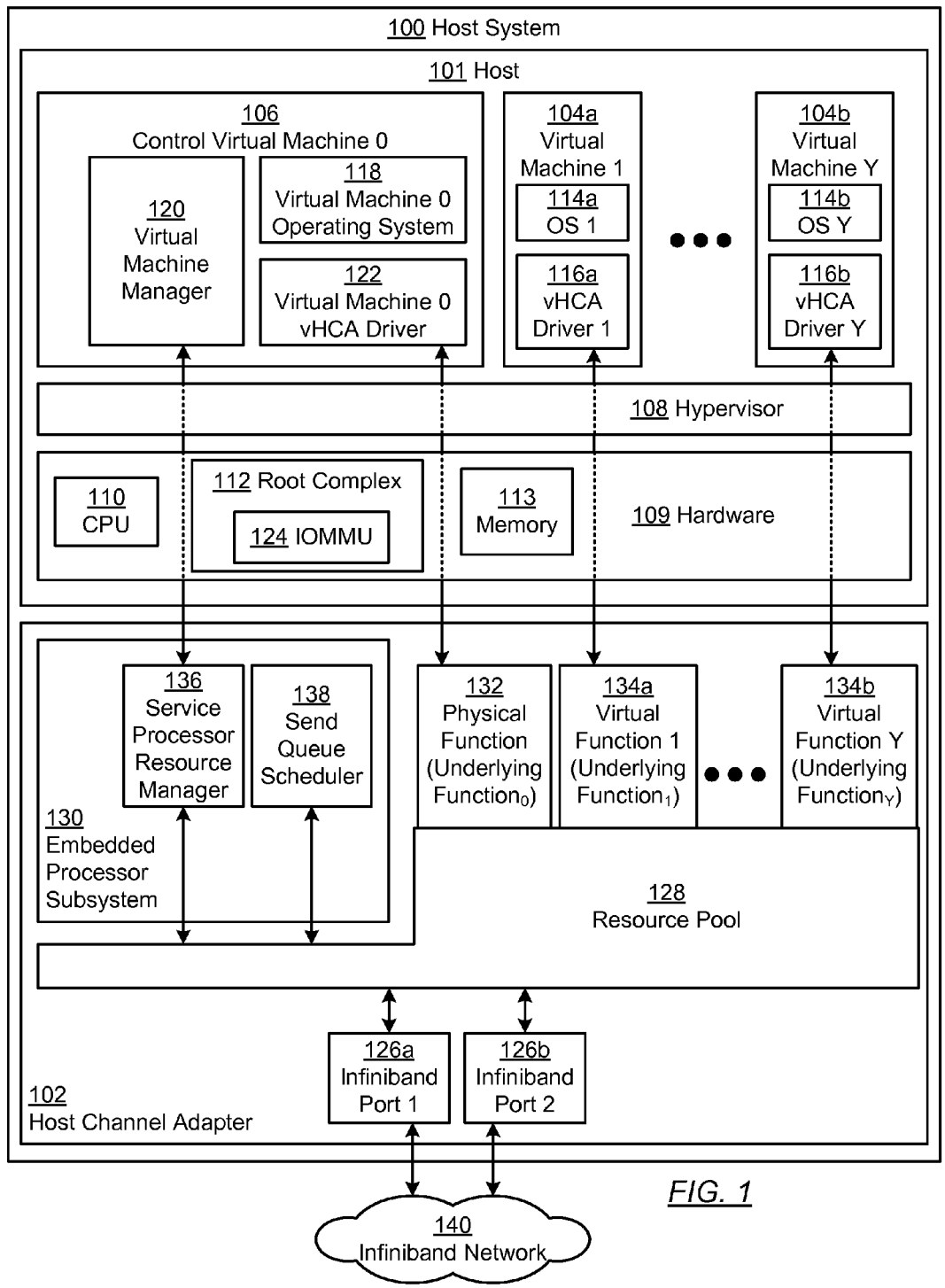
FIGS. 1-3 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and an apparatus for providing quality of service (QoS) levels within or between virtual machines for processing packets on a host channel adapter to send in an Infiniband® network. Specifically, embodiments of the invention allocate resources of the host channel adapter to each virtual machine. The amount of resources allocated provides a guarantee of available resources that the virtual machine may use when sending packets. Further, the sum of the amount of allocated resources and the amount of shared resources corresponds to a maximum transmission rate for a virtual machine to send packets on the Infiniband® network. Additionally, in one or more embodiments of the invention, each virtual machine may sub-allocate resources to different QoS levels. A QoS level is a guaranteed set of resources available to the group of commands assigned to the QoS level. By way of the sub-allocation, a virtual machine may provide different QoS levels for processing commands on the host channel adapter.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a host channel adapter (102) in one or more embodiments of the invention. These components are discussed below.

In one or more embodiments of the invention, the host (101) includes one or more guest virtual machines (e.g., virtual machine 1 (104a), virtual machine Y (104b)), a control virtual machine (106), a hypervisor (108), and a root complex (112). Each of these components is discussed below.

Broadly speaking, the virtual machines (e.g., virtual machine 1 (104a), virtual machine Y (104b), control virtual machine (106)) are distinct operating environments configured to inherit underlying functionality of the host operating system via an abstraction layer. In one or more embodiments of the invention, each virtual machine includes a separate instance of an operating system (e.g., OS 1 (114a), OS Y (114b)) (OS in FIG. 1). The separate instances of the operating system may be the same type of operating system or different types of operating systems.

Specifically, the guest virtual machine operating system (e.g., OS 1 (114a), OS Y (114b)) operates as if the guest virtual machine operating system is the only operating system on the host (101) and the resources (e.g., processor cycles, memory, resources of the host channel adapter) allocated to the guest virtual machine are the only resources available on the host (101). Thus, the guest virtual machine operating system (e.g., OS 1 (114a), OS Y (114b)) includes functionality to control the operating environment of applications executing in the guest virtual machine using resource allocated to the guest virtual machine. Each virtual machine may be allocated disjoint or non-overlapping physical memory (113).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual host channel adapter device driver (e.g., vHCA driver 1 (116a), vHCA driver Y (116b)). The virtual host channel adapter device driver is software program that provides an interface to host channel adapter (102) for the guest virtual machine operating system. Specifically, when the guest virtual machine operating system wants to send commands to the host channel adapter (102), the virtual machine operating system invokes a routine in the virtual host channel adapter device driver. In response, the virtual host channel adapter device driver issues commands to a virtualized device controller (not shown) presented by the hypervisor (108) (discussed below). In turn, the hypervisor (108) includes functionality to transmit the message to the host channel adapter (102).

In addition to the guest virtual machine (e.g., virtual machine 1 (104a), virtual machine Y (104b)), the host (101)

may also include a control virtual machine (106). In one or more embodiments of the invention, the control virtual machine (106) has a separate address space and operating system environment than the guest virtual machine (e.g., virtual machine 1 (104a), virtual machine Y (104b)). The control virtual machine (106) includes a control virtual machine operating system (118), a control virtual machine manager (120), and a virtual machine host channel adapter device driver (122). The virtual machine host channel adapter device driver (122) includes functionality similar to the guest virtual machine host channel adapter device drivers (e.g., vHCA driver 1 (116a), vHCA driver Y (116b)) discussed above. The host virtual machine operating system (118) includes functionality to provide an operating environment for software executing in the control virtual machine (106).

In one or more embodiments of the invention, the software executing in the control virtual machine (106) includes a virtual machine manager (120) (discussed below). In one or more embodiments of the invention, the virtual machine manager (120) includes functionality to configure the hypervisor (108), configure the host channel adapter (102), create, remove, and configure guest virtual machines, and perform the management of the host (101). With regards to configuring the host channel adapter, the virtual machine manager includes functionality to send commands to the host channel adapter to adjust the number of resources allocated to each virtual machine. To receive parameter values for performing the above management tasks, the virtual machine manager (120) may include a user interface and/or an application programming interface for communicating with a computer administrator or another program in one or more embodiments of the invention.

Continuing with FIG. 1, the hypervisor (108) includes functionality to control the sharing of hardware resources on the host (101). Specifically, the hypervisor (108) includes functionality to virtualize the physical devices of the host (101) so that more than one operating system may share the same physical device transparently in accordance with one or more embodiments of the invention. Further, the hypervisor (108) controls when the guest virtual machine (e.g., virtual machine 1 (104a), virtual machine Y (104b)) and the control virtual machine (106) are allowed to execute. For example, the hypervisor (108) may be a thin-privileged layer of software that only manages which guest virtual machine or the host virtual machine (106) is executing.

Continuing with the host, the host (101) includes hardware (109). The hardware (109) may include, for example, a central processing unit (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores in one or more embodiments of the invention. In general, the CPU (110) is any device configured to execute instructions on the host (101).

In one or more embodiments of the invention, the memory (113) is any type of hardware device for storage of data. In one or more embodiments of the invention, the memory (113) may be partitioned on a per-virtual machine basis, such that each virtual machine (e.g., control virtual machine (106), virtual machine 1 (104a), virtual machine Y (104b)) is allocated separate and distinct memory. In one or more embodiments of the invention, the memory (113) includes functionality to store a send queue (not shown).

A separate send queue may be stored in memory for each virtual machine Alternatively or additionally, multiple virtual machines may share one or more send queues. In one or more embodiments of the invention, a send queue includes functionality to store an ordered list of command identifiers for commands for processing by the host channel adapter (102). In one or more embodiments of the invention, the command identifiers may be the actual commands and/or references to the commands.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (101) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (101) is connected to the host channel adapter (102). In one or more embodiments of the invention, the connection between the host (101) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (101) to the Infiniband® network (140). Specifically, the host channel adapter (102) includes functionality to receive commands from the host (101) and process the commands. Processing the commands may include performing DMA with host memory to obtain and store packet data and to obtain control information, performing any validation required on the packet data, generating packets from the packet data, and sending and receiving packets on the Infiniband® network (140). FIG. 1 shows a schematic diagram of the host channel adapter (102) from the prospective of the host (101). As shown in FIG. 1, the host channel adapter (102) includes at least one Infiniband® port (e.g., Infiniband® port 1 (126a), Infiniband® port 2 (126b)), a resource pool (128), and an embedded processor subsystem (130). Each of the components of the host channel adapter is discussed below.

In one or more embodiments of the invention, an Infiniband® port (e.g., Infiniband® port 1 (126a), Infiniband® port 2 (126b)) is a physical interface connector between the host channel adapter (102) and the Infiniband® network (140). Although FIG. 1 shows two Infiniband® ports, more or fewer ports may exist without departing from the invention.

The resource pool (128) is a collection of resources that are required to send and receive packets on the Infiniband® network. Specifically, the resource pool (128) corresponds to the collection of hardware and stored data that is shared by the virtual machines (e.g., control virtual machine (106), virtual machine 1 (104a), virtual machine Y (104b)). The resource pool (128) is discussed in FIG. 2 below.

In one or more embodiments of the invention, the sharing of the resource pool is performed using the concepts of physical function and virtual functions. A physical function (132) exposes the actual hardware of the host channel adapter (102) to an operating system. Specifically, by way of the physical function, the control virtual machine operating system (118) may control the host channel adapter. Thus, the physical function allows the control virtual machine (106) to control the host channel adapter (102), such as to disable the host channel adapter (102).

A virtual function (e.g., virtual function 1 (134a), virtual function Y (134b)) exposes a virtualized host channel adapter to a virtual machine. Specifically, the virtual function (e.g., virtual function 1 (134a), virtual function Y (134b)) exposes to the virtual machine operating system only the partition of the resource pool allocated to the virtual machine. To the guest virtual machine (e.g., virtual machine 1 (104a), virtual machine Y (104b)), the resources exposed by the virtual function (e.g., virtual function 1 (134a), virtual function Y (134b)) appear as if the resource are the only resources on the host channel adapter (102). Thus, the virtual function (e.g., virtual function 1 (134a), virtual function Y (134b)) allows the virtual machine operating system (e.g., OS 1 (114a), OS Y (114b)) to control the portion of resources allocated to the virtual machine. In other words, a virtual function (e.g., virtual function 1 (134a), virtual function Y (134b)) provides the virtual machine operating system (e.g., OS 1 (114a), OS Y (114b)) the appearance that the virtual machine operating system (e.g., OS 1 (114a), OS Y (114b)) is controlling the host channel adapter (102) as a whole even though the actions of the virtual machine operating system (e.g., OS 1 (114a), OS Y (114b)) does not affect any other virtual function (e.g., virtual function 1 (134a), virtual function Y (134b)).

In one or more embodiments of the invention, the term, underlying function (UF), is used to generically refer to either a physical function or a virtual function. Specifically, as used herein, an underlying function may be a physical function or a virtual function.

The embedded processor subsystem (130) corresponds to an embedded processor and logic for managing the host channel adapter (102). The embedded processor subsystem (130) includes a service processor resource manager (136). The service processor resource manager (136) includes functionality to receive and process the management commands on the host channels adapter. For example, the management commands may be to change the allocation of host channel adapter resources, change the configuration of the host channel adapter, and perform other management of the host channel adapter. With regards to resource allocation, the service processor resource manager includes functionality to change the allocation of the host channel adapter resources to underlying functions and change the allocation of the host channel adapter resources to QoS levels within the underlying functions.

Continuing with FIG. 1, the embedded processor subsystem (130) may include a send queue scheduler (138). The send queue scheduler (138) includes functionality to schedule commands identified in the send queue on the host channel adapter. Specifically, the send queue scheduler includes functionality to iterate through the send queue and store commands identified in the send queue on the host channel adapter (102).

Figure 2:
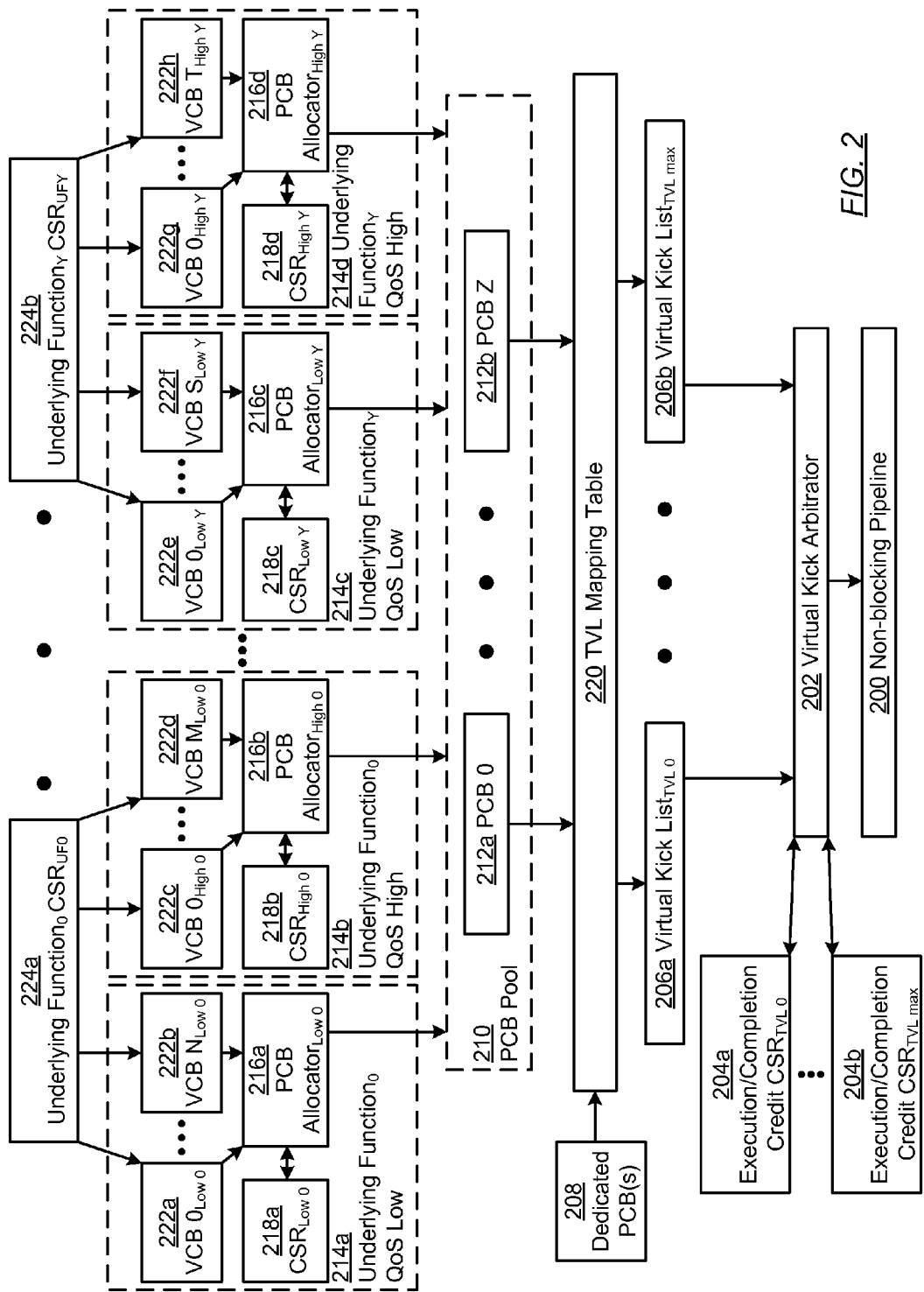

As discussed above, FIG. 1 provides a general diagram of the host channel adapter (102) in one or more embodiments of the invention. FIG. 2 shows a schematic diagram of the resources of the host channel adapter and QoS management components in one or more embodiments of the invention. Specifically, FIG. 2 shows components of the resource pool for transmission of messages on the Infiniband® network as shared between virtual machines and components to allocate resources of the resource pool in one or more embodiments of the invention.

In general, the resource pool is configured to receive and execute commands from a virtual machine. A command corresponds to an instruction to the host channel adapter. For example, a command may be an instruction to send a message on the Infiniband® network (not shown). A command includes command data in one or more embodiments of the invention. Specifically, command data is data in the command.

When the command is an instruction to send a message on the Infiniband® network, the command may include the message itself or one or more addresses in the host memory having the message. The host channel adapter is configured to obtain the command, obtain the message from the command or from host memory referenced in the command, partition the message into packets if required, and send the packets on the Infiniband® network in accordance with an Infiniband® protocol. In one or more embodiments of the invention, the message is packet data. Specifically, packet data is data sent in the packets on the Infiniband® network. Thus, the packet data may be in the command or in the one or more addresses in host memory.

As shown in FIG. 2, the resource pool of the host channel adapter and the QoS management components include a non-blocking pipeline (200), a virtual kick arbitrator (202), transmit virtual lane (TVL) execution and completion credit control and status registers (CSRs) (e.g., execution/completion credit $CSR_{TVL0}$ (204a), execution/completion credit $CSR_{TVLmax}$ (204b)), TVL virtual kick lists (e.g., virtual kick $list_{TVL0}$ (206a), virtual kick $list_{TVLmax}$ (206b)), a mapping table (220), physical collect buffer (PCB) pool (210), dedicated PCBs (208), a PCB allocator (e.g., PCB $Allocator_{Low0}$ (216a), PCB $Allocator_{High0}$ (216b), PCB $Allocator_{LowY}$ (216c), PCB $Allocator_{HighY}$ (216d)), a QoS (QoS) CSRs (e.g., $CSR_{Low0}$ (218a), $CSR_{High0}$ (218b), $CSR_{LowY}$ (218c), $CSR_{HighY}$ (218d)), virtual collect buffers (VCBs) (e.g., VCB $0_{Low0}$ (222a), VCB $N_{Low0}$ (222b), VCB $0_{High0}$ (222c), VCB $M_{High0}$ (222d), VCB $0_{LowY}$ (222e), VCB $S_{LowY}$ (222f), VCB $0_{HighY}$ (222g), VCB $T_{HighY}$ (222h)), and underlying function CSRs (e.g., underlying function CSRs (224a), underlying $function_0$ $CSR_{UF0}$ (224b)). Each of these components is discussed below.

The non-blocking pipeline (200) corresponds to a set of hardware and/or firmware that includes functionality to process commands on the host channel adapter. Specifically, the non-blocking pipeline (200) includes functionality to obtain a command from a PCB (described below), obtain packet data based on the command data, verify the queue pair for sending the packet data, generate one or more packets having the packet data, and sending the packets on the Infiniband® network in accordance with the Infiniband® protocol. In one or more embodiments of the invention, the non-blocking pipeline (200) is partitioned into modules (not shown). Each module corresponds to hardware and/or firmware that includes functionality to perform a portion of the nonblocking pipeline. For example, one module may be configured to perform DMA with the host memory while another module may be configured to generate packets having the packet data.

In one or more embodiments of the invention, one of the modules includes a completion module. A completion module includes functionality to store messages in a completion linked list queue until an acknowledgement is received or transmission is deemed to have failed, such as by not receiving an acknowlegement within a predefined period of time. In one or more embodiments of the invention, the completion module is used when a queue pair is set in reliable transmission mode.

In one or more embodiments of the invention, the non-blocking pipeline is time shared amongst TVLs. In particular, a TVL may consume a time slice of the non-blocking pipeline. In other words, commands assigned to a TVL may be blocked by the execution through the pipeline of one or more other commands in the same TVL. In contrast to commands assigned to the same TVL, when a command is assigned to a different TVL, the command is not blocked by other commands in different TVLs. In one or more embodiments of the invention, each TVL has a corresponding set of execution and completion credits. The execution and completion credits for one or more TVLs may be stored and managed using one or more execution and completion credit CSRs (e.g., execution/completion credit $CSR_{TVL0}$ (204a), execution/completion credit $CRS_{TVLmax}$ (204b)) and a virtual kick list (e.g., virtual kick list$_{TVL0}$ (206a), virtual kick list$_{TVLmax}$ (206b)).

An execution and completion credit CSR stores the number of execution credits and the number of completion credits allocated to a TVL. An execution credit represents a guaranteed number of commands that the TVL may have in the non-blocking pipeline at a single time. In one or more embodiments of the invention, an execution credit represents a DMA context. A DMA context is a storage unit in a DMA linked list queue, that is used by the DMA scheduling algorithm to allow a resource to gain access to the DMA payload memory (e.g., to obtain packet data from the host), send PCI express DMA requests, and when DMA data is obtained, enter into outgoing packet transmit scheduling. In other words, each command requires a single execution credit to execute in the pipeline in one or more embodiments of the invention. Thus, in order for the non-blocking pipeline to execute the command, an execution credit is consumed. When execution of the command completes, the execution credit is returned to the TVL.

A completion credit represents a guaranteed entry in the completion linked list queue. Each command requires a single completion credit to execute in the pipeline in one or more embodiments of the invention. More specifically, in order for the non-blocking pipeline to execute the command, a completion credit is consumed. After the command is sent and if required by the queue pair, acknowledgement is received or transmission is deemed to have failed, the completion credit is returned to the TVL.

In addition to the execution credits and the completion credits allocated to the TVL, the TVLs may share a set of execution credits and completion credits. The shared set of execution and completion credits may be consumed by any TVL to allocate a command. Thus, for example, if the TVL does not have an available execution credit, the command may be executed if a shared execution credit is available. In such an example, the shared execution credit is consumed when the command begins execution.

In one or more embodiments of the invention, each TVL is associated with a virtual kick list (e.g., virtual kick list$_{TVL\ 0}$ (206a), virtual kick list$_{TVL\ max}$ (206b)). A virtual kick list (e.g., virtual kick list$_{TVL\ 0}$ (206a), virtual kick list$_{TVL\ max}$ (206b)) corresponds to a storage location for storing command identifiers of commands, assigned to the TVL, for which a kick has issued. A kick indicates that the command is ready for execution on the non-blocking pipeline (200). Specifically, in one or more embodiments of the invention, the kick indicates that the entirety of the command is stored on the host channel adapter. In one or more embodiments of the invention, commands are processed from the virtual kick list in a first in first out (FIFO) order. In other words, the commands are processed in the order in which the commands are received.

In one or more embodiments of the invention, the command identifier of the command may be the command, an address of a memory location having the command, or any other data that identifies the command. For example, the command identifier may be an address or identifier of the PCB (discussed below) having the command.

In one or more embodiments of the invention, a virtual kick arbitrator (202) is operatively interposed between the virtual kick list (e.g., virtual kick list$_{TVL0}$ (206a), virtual kick list$_{TVLmax}$ (206b)) and the non-blocking pipeline (200) in one or more embodiments of the invention. In one or more embodiments of the invention, the virtual kick arbitrator includes functionality to arbitrate between TVLs having commands initiating execution on the pipeline. Specifically, the virtual kick arbitrator includes functionality to identify a set of TVLs that have an available execution credit and an available completion credit, select a TVL from the set of TVLs with an available execution credit and an available completion credit, and initiate execution of the command from the virtual kick list when execution and completion credits are available. The virtual kick arbitrator (202) may further include functionality to increment and decrement the number of execution and completion credits in the execution and completion credit CSR (e.g., execution/completion credit $CSR_{TVL0}$ (204a), execution/completion credit $CSR_{TVLmax}$ (204b)).

Continuing with FIG. 2, the host channel adapter includes PCBs (e.g., dedicated PCBs (208), PCB 0 (212a), PCB Z (212b)). A PCB is physical memory that is configured to store a single command. Further, each command requires a single PCB in one or more embodiments of the invention.

Dedicated PCBs correspond to PCBs that are dedicated for use by administrator and management components in one or more embodiments of the invention. For example, dedicated PCBs may be used by the service processor resource manager, the send queue scheduler, a host process for controlling the host channel adapter, and for other such components of the system.

In one or more embodiments of the invention, the host channel adapter includes a PCB pool (210). A PCB pool (210) corresponds to a collection of PCBs (e.g., PCB 0 (212a), PCB Z (212b)) that are available for use by any underlying function. Specifically, each PCB (e.g., PCB 0 (212a), PCB Z (212b)) in the PCB pool (210) may used by any underlying function in one or more embodiments of the invention. When a PCB is in use by an underlying function QoS level (e.g., Underlying Function$_0$ QoS Low (214a), Underlying Function$_0$ QoS High (214b), Underlying Function$_Y$ QoS Low (214c), Underlying Function$_Y$ QoS High (214d)) to store a command, the PCB is considered bound to the underlying function QoS level and cannot be used by another underlying function QoS level.

Continuing with FIG. 2, a TVL mapping table is operatively interposed between the PCBs (e.g., dedicated PCBs (208), PCB 0 (212a), PCB Z (212b)) and the virtual kick list (e.g., virtual kick list$_{TVL0}$ (206a), virtual kick list$_{TVLmax}$ (206b)) in one or more embodiments of the invention. The TVL mapping table (220) includes a mapping of the underlying function QoS level (e.g., Underlying Function$_0$ QoS Low (214a), Underlying Function$_0$ QoS High (214b), Underlying Function$_Y$ QoS Low (214c), Underlying Function$_Y$ QoS High (214d)) to one or more TVLs. In particular, the mapping defines, for each underlying function QoS levels, which TVLs correspond to the underlying function QoS level. Specifically, each underlying function may be allocated a set of TVLs. The virtual machine corresponding to an underlying function may sub-allocate the underlying function's set of TVLs to different QoS levels. In one or more embodiments of the invention, the mapping of set of TVLs may be storage of an identifier of the underlying function QoS level with an identifier of the virtual kick lists corresponding to the TVLs in the set of TVLs.

Additionally, in one or more embodiments of the invention, a set of TVLs may be allocated to the dedicated PCBs (208). Thus, the TVL mapping table (220) may further include a mapping of the dedicated PCBs to the set of TVLs allocated to the dedicated PCBs.

Continuing with FIG. 2, the PCB pool (210) is connected to one or more PCB allocators. A PCB allocator is logic, such as hardware or firmware, configured to select the PCB from the PCB pool (210) for storing a command. In one or more embodiments of the invention, each underlying function is allocated a configurable number of PCBs. The number of PCBs allocated to the underlying function provides a guarantee as to the number of commands that may be stored for the underlying function at any given moment. If the summation of the numbers of PCBs allocated is less than the total number of PCBs in the PCB pool, then the remaining number of PCBs is shared amongst the underlying functions. Further, in one or more embodiments of the invention, each underlying function may partition the allocated number of PCBs to different QoS levels. In other words, each QoS level of an underlying function may have a guaranteed number of PCBs that store commands for the QoS level.

The following is for example purposes only and not intended to limit the scope of the invention. In the following example, consider the scenario in which, $UF_0$ is allocated eight PCBs and $UF_Y$ is allocated ten PCBs. In such an example, the virtual machine corresponding to $UF_0$ optionally may sub-allocate the eight PCBs amongst the QoS levels supported by the underlying function. For example, the virtual machine may allocate six PCBs to $UF_0$ high QoS level (214b) and two PCBs to $UF_0$ low QoS level (214a). Further, in the example, the virtual machine corresponding to $UF_Y$ may optionally sub-allocate the ten PCBs amongst the QoS levels supported by the underlying function. For example, the virtual machine may allocate five PCBs to $UF_Y$ low QoS level (214c), three PCBs to $UF_Y$ high QoS level (214d), and have the remaining two PCBs shared amongst the different $UF_Y$ QoS levels.

In one or more embodiments of the invention, the allocator (202) is operatively connected to a QoS level CSR (e.g., $CSR_{Low0}$ (218a), $CSR_{High0}$ (218b), $CSR_{LowY}$ (218c), $CSR_{High0}$ (218d)). Specifically, the QoS level CSR is hardware storage. The QoS level CSR is configured to store information about the number of PCBs allocated to the underlying function QoS level. For example, the QoS level CSR may store the number of PCBs available, the number of PCBs in use, and/or the total number of PCBs allocated to the QoS level.

In one or more embodiments of the invention, the PCB allocator further includes functionality to bind the PCB to a VCB (VCB) (e.g., VCB $0_{Low0}$ (222a), VCB $N_{Low0}$ (222b), VCB $0_{High0}$ (222c), VCB $M_{High0}$ (222d), VCB $0_{LowY}$ (222e), VCB $S_{LowY}$ (222f), VCB $0_{HighY}$ (222g), VCB $T_{HighY}$ (222h)). In one or more embodiments of the invention, a VCB is a virtual address space used by a process on the host to write to a PCB. Specifically, a single VCB is capable of being bound to only a single PCB at any single moment in time in one or more embodiments of the invention. Thus, the binding a PCB to a VCB creates an association between the VCB and the PCB. In other words, the binding prevents the PCB from being used by any other VCB and prevents the VCB from being associated with any other PCB.

In one or more embodiments of the invention, an underlying function CSR (e.g., $CSR_{UF\,0}$ (224a), $CSR_{UF\,Y}$ (224b)) stores status and control information about the VCBs allocated to the underlying function. Specifically, each underlying function is allocated a set of VCBs from a VCB pool (discussed below and in FIG. 3). The virtual machine corresponding to the underlying function may sub-allocate the set of VCBs to different underlying function QoS levels. The number of VCBs allocated to an underlying function represents a guarantee of the number of commands that the HCA will process for the virtual machine corresponding to the underlying function. In one or more embodiments of the invention, the number of VCBs allocated to an underlying function may exceed the number of PCBs allocated to the underlying function. The flowcharts of FIGS. 7 and 8, discussed below, provide a method for processing requests when the underlying function QoS level has a VCB available and no PCBs available.

Continuing with FIG. 2, in one or more embodiments of the invention, the underlying function CSR (e.g., $CSR_{UF\,0}$ (224a), $CSR_{UF\,Y}$ (224b)) may include a base address register (BAR) and a sub-BAR (sub-BAR). The BAR stores the lowest address assigned to the underlying function in one or more embodiments of the invention. In one or more embodiments of the invention, the sub-BAR stores a divider address between different QoS levels of an underlying function. For example, the sub-BAR may correspond to the lowest address assigned to the underlying function high QoS level. The underlying function CSR may further store information about which VCBs are in use in one or more embodiments of the invention.

Figure 3:
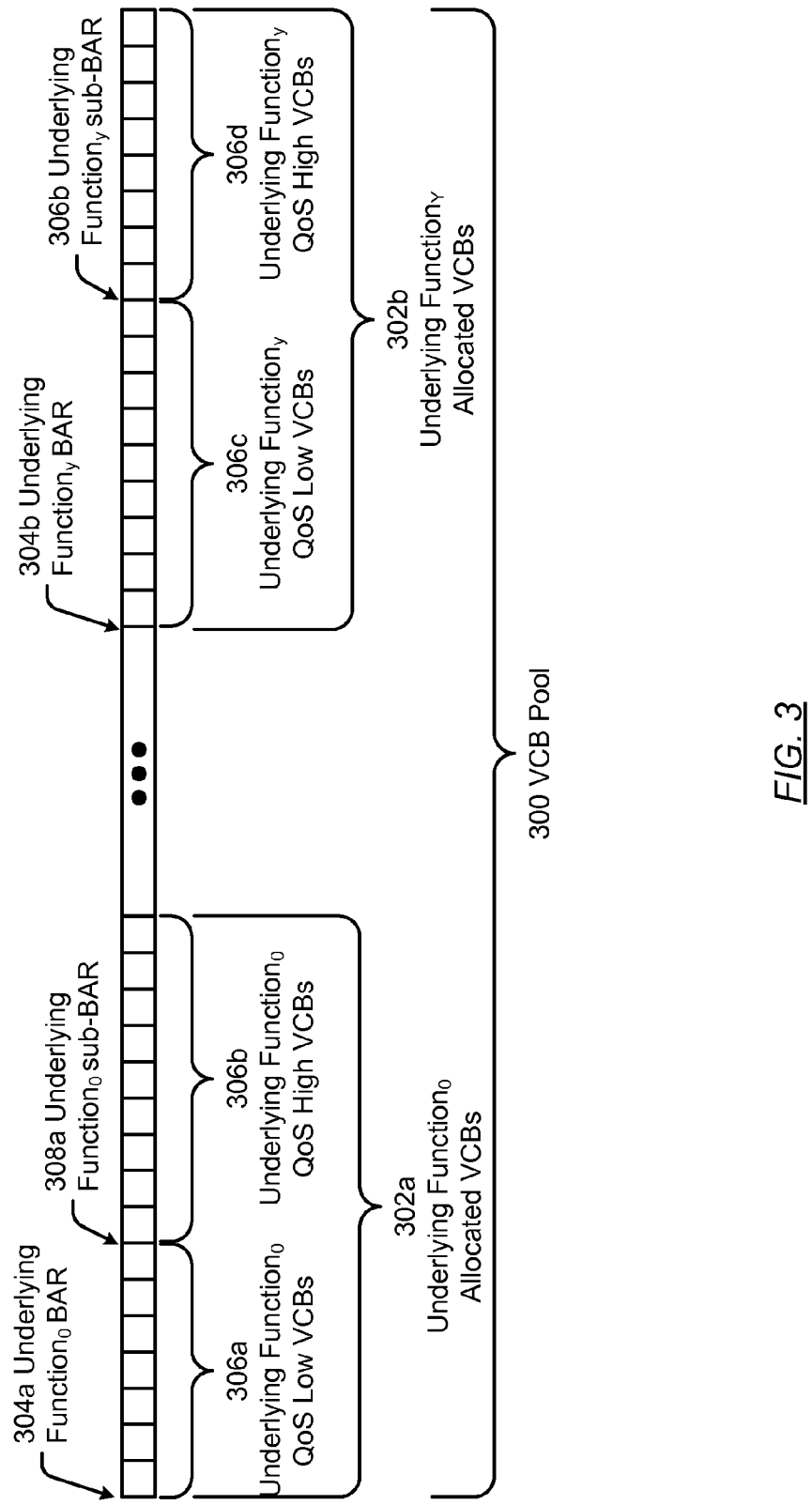

FIG. 3 shows a schematic diagram of a VCB pool (300) in one or more embodiments of the invention. In one or more embodiments of the invention, the VCB pool is an address space partitioned into VCBs (each VCB is shown as a square block in FIG. 3). As shown in FIG. 3, each underlying function may be allocated a set of VCBs (e.g., $UF_0$ allocated VCBs (302a), $UF_Y$ allocated VCBs (302b)). The number of VCBs allocated to each underlying function may or may not be the same as the number of VCBs allocated to different underlying functions. The underlying function BAR (e.g., $UF_0$ BAR (304a), $UF_Y$ BAR (304b)) stores the address of the first VCB allocated to the underlying function in one or more embodiments of the invention.

Further, as shown in FIG. 3, the allocated set of VCBs may be sub-allocated into QoS levels. Specifically, each underlying function QoS level may be allocated a subset of the underlying functions VCBs (e.g., Underlying Function$_0$ QoS Low VCBs (306a), Underlying Function$_0$ QoS High VCBs (306b), Underlying Function$_Y$ QoS Low VCBs (306c), Underlying Function$_Y$ QoS High VCBs (306d)). The number of VCBs allocated to each underlying function QoS level may or may not be the same as the number of VCBs allocated to one or more different underlying function QoS level. The underlying function sub-BAR (e.g., $UF_0$ sub-BAR (308a), $UF_Y$ sub-BAR (308b)) stores a dividing address of the VCB allocated to a different QoS level for the underlying function. For example, in FIG. 3, the sub-BAR (e.g., $UF_0$ sub-BAR (308a), $UF_Y$ sub-BAR (308b)) stores the address of the first VCB allocated to the high QoS level in one or more embodiments of the invention.

Although FIGS. 1-3 show a certain configuration of components, other configurations may be used without departing from the invention. For example, rather than having a PCB pool from which any underlying function may use, individual PCB may be allocated to a particular underlying function to be used solely for the particular underlying function. By way of another example, although FIG. 2 shows a separate PCB allocator for each underlying function and each QoS level, the functionality of separate PCB allocators may be performed by a single PCB allocator. Other variations of the system may be used without departing from the invention.

FIGS. 4-10 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 4:
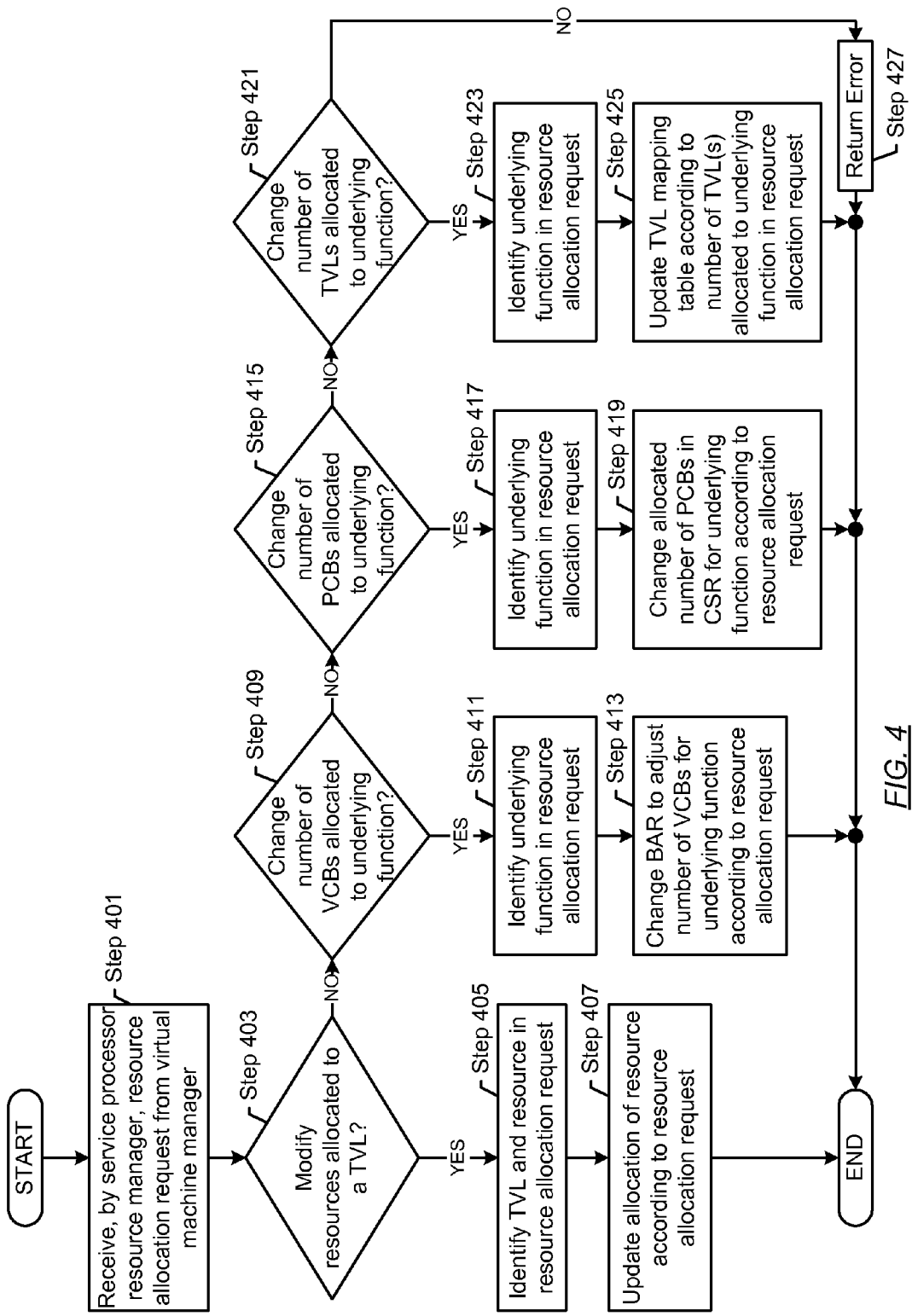
FIGS. 4-10 show flowcharts in one or more embodiments of the invention.

FIG. 4 shows a flowchart for allocating resources to different underlying function and TVLs in one or more embodiments of the invention. In one or more embodiments of the invention, the allocating of resources changes the guaranteed levels of access to the resource to the virtual machine. For example, if the virtual machine has more resources, then the virtual machine may have a greater level of throughput for processing commands on the host channel adapter. Conversely, decreasing the resources to a virtual machine may decrease the level of throughput for processing commands on the host channel adapter. In one or more embodiments of the invention, because TVLs are allocated to virtual machines, changing the resources allocated to a TVL indirectly changes the allocation of the resources to the corresponding virtual machine.

In one or more embodiments of the invention, the virtual machine manager may adjust the allocation of the resources to the underlying functions and the TVL. For example, the virtual machine manager may automatically adjust the allocation of resources or adjust the allocation of resources based on an instruction from a host system administrator or another software program. Automatic adjustment may be, for example, based on detecting that a virtual machine has been migrated to a different host and, therefore, the resources for the virtual machine should be deallocated, detecting that a new virtual machine is on the host and, therefore, the resources for the new virtual machine should be allocated, detecting that a virtual machine is not using all of the resources allocated to the underlying function corresponding to the virtual machine, or based on other performance metrics. Similarly, a host system administrator may adjust the allocation of resources, for example, based on any of the above, to fulfill service performance contracts, or for other reasons.

In Step 401, the service processor resource manager receives a resource allocation request from the virtual machine manager in one or more embodiments of the invention. In one or more embodiments of the invention, when the virtual machine manager sends a command to the host, the virtual machine manager may write the command, using the host channel adapter device driver, to a dedicated PCB. In one or more embodiments of the invention, the command includes an identifier that the command is a resource allocation request, an identifier of the resource to modify, an identifier of the TVL or underlying function, and an identifier of the new amount of the resource to allocate. The identifiers may be explicit or implicit in the resource allocation request. For example, an identifier of the TVL or underlying function and the identifier of the resource to modify may be an identifier of a register that corresponds to both the TVL or underlying function and resource. Writing the command to the dedicated PCB is discussed below and in FIG. 6. In one or more embodiments of the invention, when a command corresponding to a resource allocation request is received in the dedicated PCB, the command is processed and executed by the service processor resource manager.

Continuing with FIG. 4, in Step 403, a determination is made about whether the resource allocation request is to modify resources allocated to a TVL in one or more embodiments of the invention. For example, the resource allocation request may be to change the number of execution and/or completion credits allocated to the TVL, the resource allocation request may be to change the size of the linked list, or the resource allocation request may be to change other resources of the pipeline that are allocated to the TVL.

In Step 405, if the resource allocation request is to modify resources allocated to a TVL, then the TVL and the resource are identified from the resource allocation request. In one or more embodiments of the invention, the resource allocation request complies with a predefined protocol that specifies different fields of the resource allocation request. Thus, identifying the resource and the TVL may be performed in accordance with the protocol.

In Step 407, the allocation of the resource is updated according to the resource allocation request in one or more embodiments of the invention. Changing the allocation of the resource may be performed, for example, by changing a value in a register corresponding to the resource and the TVL. For example, changing the number of execution or completion credits may be performed by changing the value of the number of execution or completion credits in the corresponding register of the CSR corresponding to the TVL. Changing the size of the linked list may be performed by adjusting a maximum size in a register corresponding to the TVL.

In one or more embodiments of the invention, if the resource is limited and the resource allocation request is to increase the amount of the resource allocated to the TVL, then a determination is made about whether sufficient amount of unallocated portion of the resource exists (not shown). For example, the unallocated portion of the resource may be shared amongst TVLs. If a sufficient amount of the unallocated portion of the resource does not exist, then the service processor resource manager may generate an error message to the virtual machine manager that indicates that the resource allocation request is invalid. If a sufficient amount of the unallocated portion of the resource exists, then the service processor resource manager may allocate the unallocated portion of the resource, or a portion thereof, to the identified TVL.

Continuing with FIG. 4, in Step 409, a determination is made about whether the resource allocation request is to change the number of VCBs allocated to an underlying function. If the resource allocation request is to change the number of VCBs allocated to an underlying function, in Step 411, the underlying function is identified. As discussed above, the resource allocation request complies with a pre-defined protocol. Accordingly, the underlying function may be specified in a field of the resource allocation request, such as by way of an identifier of the underlying function or an identifier of a CSR corresponding to the underlying function.

In Step 413, based on the identification, the BAR corresponding to the underlying function is changed to adjust the number of VCBs of the underlying function according to the resource allocation request. For example, the resource allocation request may specify a new virtual address to store in the BAR.

In Step 415, a determination is made about whether the resource allocation request is to change the number of PCBs allocated to an underlying function. If the resource allocation request is to change the number of PCBs, in Step 417, the underlying function in the resource allocation request is identified. Identifying the underlying function may be performed as discussed above with reference to Step 411.

In Step 419, the allocated number of PCBs in the CSR corresponding to the underlying function is changed according to the resource allocation request. In one or more embodiments of the invention, because the number of PCBs is limited, if the resource allocation request is to increase the number of PCBs, then a determination is made about whether sufficient number of unallocated PCBs exist before changing the allocation. For example, the determination may be made about whether a sufficient number of shared PCBs exist to allocate to the underlying function. If a sufficient number of PCBs does not exist, then the service processor resource manager may generate an error message to the virtual machine manager that indicates that the resource allocation request is invalid. If a number of unallocated PCBs exist, then the service processor resource manager may allocate the unallocated PCBs to the underlying function. In one or more embodiments of the invention, allocating the PCBs to the underlying function may include increasing the number of PCBs in the CSR corresponding to the underlying function. Further, the allocation may include decreasing the number of shared PCBs shared amongst multiple underlying functions in one or more embodiments of the invention.

Continuing with FIG. 4, in Step 421, a determination is made whether the resource allocation request is to change the number of TVLs allocated to an underlying function. If the resource allocation request is to change the number of TVLs, in Step 423, the underlying function in the resource allocation request is identified. Identifying the underlying function may be performed as discussed above with reference to Step 411.

In Step 425, if the resource allocation request is to update the number of TVLs to allocate to an underlying function, then the TVL mapping table is updated in accordance with the resource allocation request. Different methods may be used to update the TVL mapping table. For example, a current version of the TVL mapping table may be stored in host memory and the TVL mapping table or one or more entries in the TVL mapping table may be marked as invalid. Thus, in this example, when TVL identification is required (e.g., because of an invalid TVL mapping table or invalid entries), a new mapping table or entries from the mapping table may be obtained from host memory. Another method that may be used is for the resource allocation request to include all or a portion of the TVL mapping table. For example, the resource allocation request may specify the new values of specific entries of the TVL mapping table.

Another method that may be used is for the resource allocation request to specify a number of TVLs to allocate to the underlying function. In such a scenario, if the resource allocation request specifies to increase the number of TVLs, the service processor resource manager may select a set of unallocated TVLs to allocate to the underlying function. If the amount of the increase is greater than the number of unallocated TVLs, the service processor resource manager may generate an error message. In one or more embodiments of the invention, if the resource allocation request specifies a number of TVLs to remove, then the resource allocation request may select a subset of the TVLs allocated to the underlying function. Further, the service processor resource manager may transfer the allocation of the subset of TVLs to being shared.

In one or more embodiments of the invention, if the resource allocation request does not match any recognized allocations, the host channel adapter may return an error message to the host in Step 427. Although FIG. 4 shows particular types of resource allocation requests, alternative or other types of resource allocation requests may exist without departing from the invention.

In one or more embodiments of the invention, when an underlying function has a number of QoS levels, the service process resource manager may fulfill resource allocation requests by adding or removing the resources to/from a shared set of resources that is shared amongst the QoS levels, adding or removing the resources to/from a selected default QoS level, adding or removing resources to/from each QoS level such that the total is the amount requested, or performing another action.

Although FIG. 4 shows changing a single resource for a single underlying function or TCL, the resource allocation request may include multiple changes without departing from the invention. For example, the changes may be to change both the execution credit and completion credits for a TVL, completely update the mapping table, or performing other functions.

Figure 5:
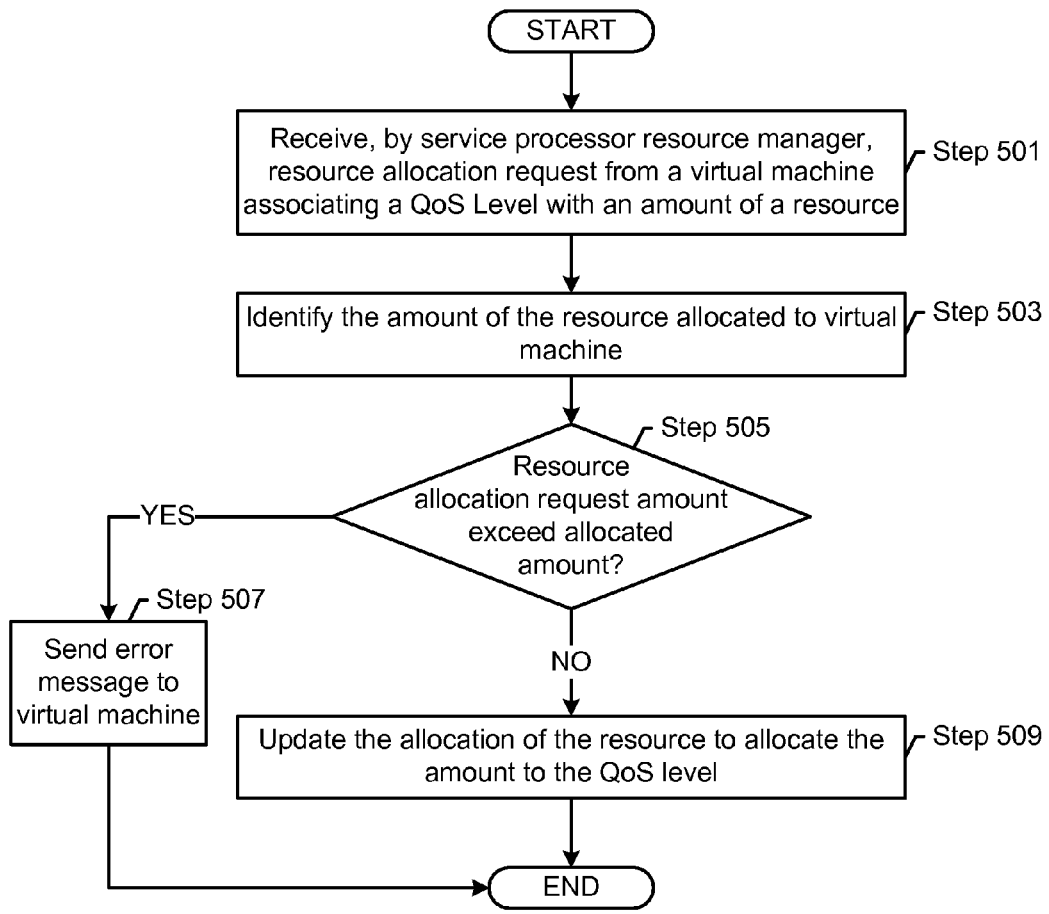

FIG. 5 shows a flowchart for allocating resources to different QoS levels within an underlying function in one or more embodiments of the invention. Specifically, each virtual machine may change the allocation of resources amongst the QoS levels defined by the virtual machine. The change may be initiated, for example, by the virtual machine operating system submitting a command. In one or more embodiments of the invention, the command is processed using the resources allocated to the virtual machine. The processing of the command may direct the command to the service processor resource manager based on the command corresponding to a resource allocation request.

In Step 501, the service processor resource manager receives a resource allocation request from a virtual machine that associates a QoS level with an amount of a resource. From the resource allocation request, the virtual machine, QoS, amount, and the resource are identified in one or more embodiments of the invention. The identification may be performed, for example, based on the resource allocation request complying with a predefined protocol.

In Step 503, the amount of the resource allocated to the virtual machine is identified in one or more embodiments of the invention. Specifically, the total amount that the virtual machine manager allocated to the underlying function corresponding to the virtual machine is identified. The amount of the resources allocated may be found by aggregating the total amounts across all QoS levels and the amount of the resource that is shared. The aggregated amount may be stored, for example, in a register or calculated for each resource allocation request.

In Step 505, a determination is made about whether the resource allocation request amount exceeds the allocated amount. If the resource allocation request amount exceeds the allocated amount, then the virtual machine is attempting to allocate more resources than allocated to the underlying function. Accordingly, in Step 507, an error message is generated if the resource allocation request amount exceeds the allocated amount. In one or more embodiments of the invention, the error message is transmitted to the virtual machine (not shown).

In Step 509, if the resource allocation request amount does not exceed the allocated amount, then the allocation of the resource is updated to allocate the amount to the QoS level. In one or more embodiments of the invention, resources allocated to the virtual machine may be suballocated by the virtual machine to the QoS levels of the virtual machine. The suballocation may be performed by updating the corresponding registers or mapping table entries that associate the resource with the QoS level.

In particular, the updating may be performed similar to the updating of the resources allocated to the virtual machine as discussed above with regards to FIG. 4. For example, to update the number of VCBs, a new value may be stored in the sub-BAR to reference a new division between the VCBs allocated to one QoS level with the VCBs allocated to another QoS level. Further, the TVL mapping table may be updated similar to discussed above, to allocate, to the QoS level, a subset of the set of TVLs allocated to the virtual machine. Updating the TVL mapping table may be performed as discussed above with reference to Step 423 in FIG. 4. Updating the number of PCBs may be performed by changing the value in the CSR corresponding to the QoS level. If the updated number of PCBs is an increase, a determination may be made about whether the requested number exceeds the number of shared PCBs that are shared amongst the QoS levels of the virtual machine. If the requested number exceeds the shared number, then an error message may be generated. If the requested number does not exceed the shared number, then the shared PCBs are allocated to the QoS level.

As shown above and in FIGS. 4 and 5, the allocation of resources of the host channel adapter may be performed on at least two levels in one or more embodiments of the invention. The first level allocates the resources to the virtual machine. The second level sub-allocates the resources to different QoS levels within each virtual machine. By having the at least two levels of allocation, the host has control of how the resources of host channel adapter are used and the resource level guarantees of the host channel adapter.

Figure 6:
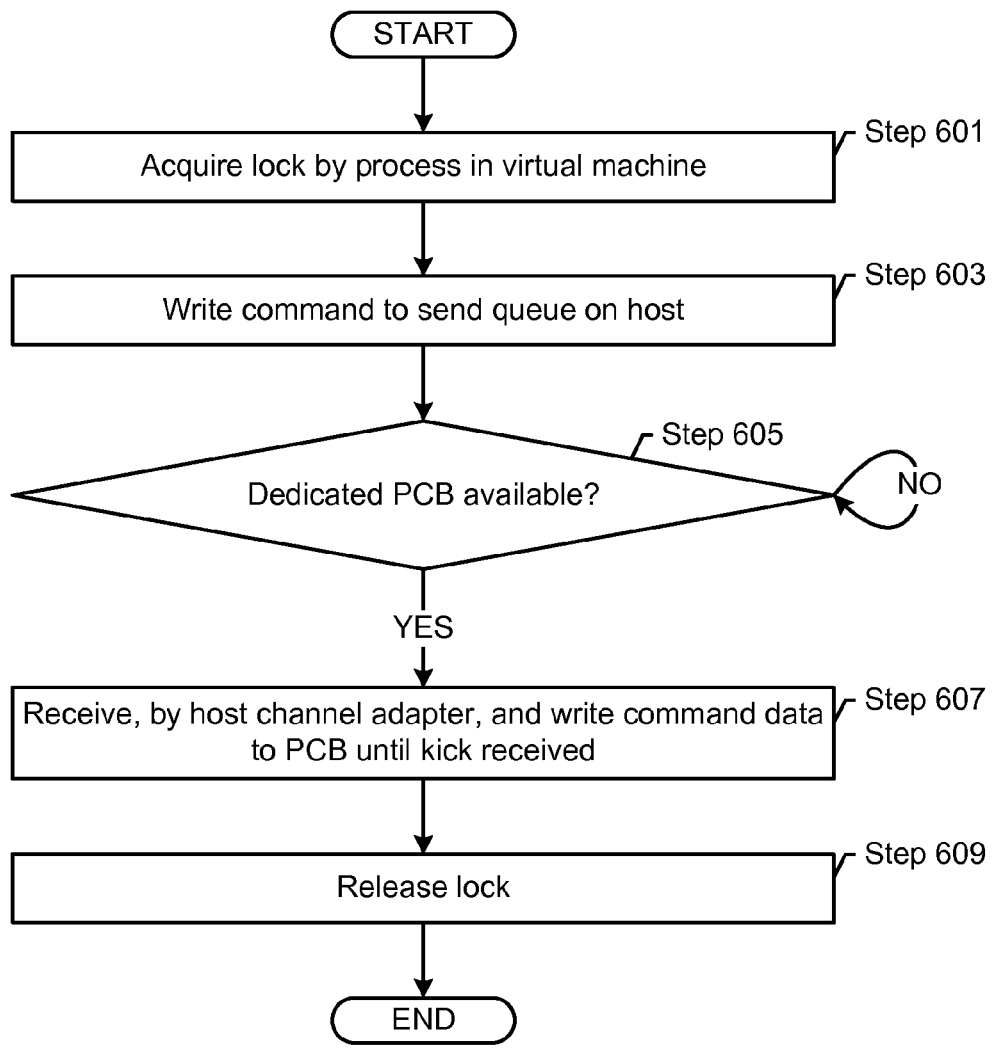

FIGS. 6-10 show flowcharts for processing commands in one or more embodiments of the invention. FIG. 6 shows a flowchart for using the dedicated PCBs by a process in a virtual machine in one or more embodiments of the invention.

In Step 601, a process executing in a virtual machine acquires a lock to the dedicated PCB. In one or more embodiments of the invention, the lock is located on the host channel adapter. In Step 603, the process executing in the virtual machine writes a command to the send queue on the host. In one or more embodiments of the invention, the writing of the command to the send queue may be performed by acquiring a separate lock corresponding to the memory location of physical memory having the send queue and storing the command in the memory location.

Continuing with FIG. 6, in Step 605, the virtual machine determines whether a dedicated PCB is available. In one or more embodiments of the invention, determining whether a dedicated PCB is available may be performed by checking a CSR that indicates whether the corresponding dedicated PCB is in use. In one or more embodiments of the invention, the CSR may be set and checked by both hosts processes and the embedded processor subsystem.

In Step 607, when the dedicated PCB is available, the host channel adapter receives command data (i.e., data in the command) and writes the command data to the PCB until the kick is received. Specifically, in one or more embodiments of the invention, the command data may be transmitted to the host channel adapter using the PCI express fabric. Each command may be of variable length. The kick indicates that the entirety of the command is stored in the PCB. In one or more embodiments of the invention, the kick may be an instruction sent to the host channel adapter in accordance with a predefined protocol. Another method for performing Step 607 is discussed below and in FIG. 9. Continuing with FIG. 6, in Step 609, the lock is released in one or more embodiments of the invention.

Although FIG. 6 shows a flowchart for a process on the host to use the dedicated PCB, in one or more embodiments of the invention, dedicated PCBs may be used by the virtual machine manager, the send queue scheduler, portions of the electronic processor subsystem, and other components to perform management functions.

Figure 7:
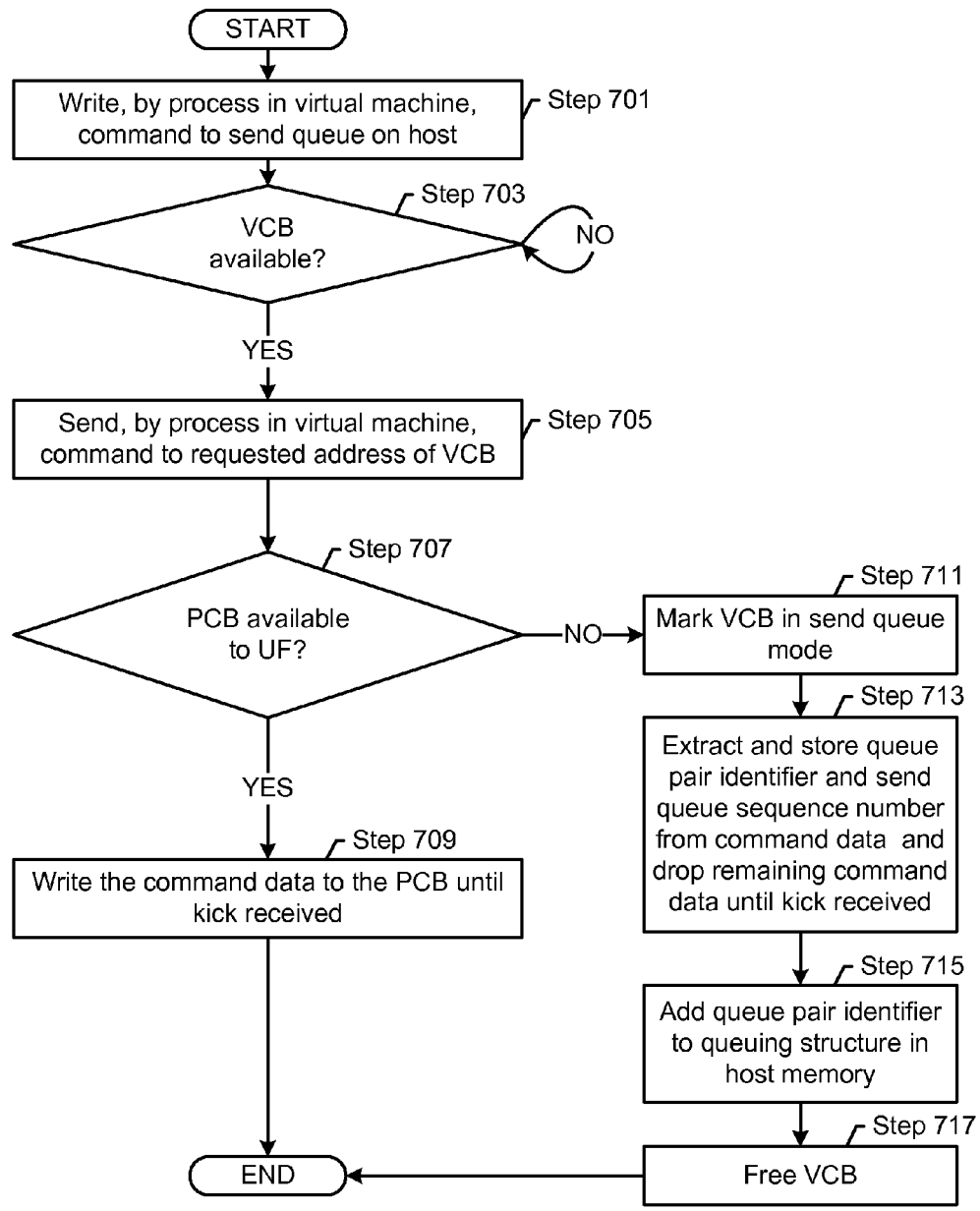

FIG. 7 shows a flowchart for a virtual machine (e.g., control virtual machine, guest virtual machine) to send a command to the host channel adapter using VCBs. In Step 701, a process in the virtual machine writes the command to the send queue on the host. As discussed above, to write the command to the send queue, the process may acquire a lock for the send queue.

In Step 703, a determination is made about whether a VCB is available. Management of the usage of the VCBs is performed by the virtual machine operating system in one or more embodiments of the invention. Specifically, the virtual machine operating system allocates the VCBs to the process in the virtual machine requesting the VCB.

The virtual machine operating system may allocate the VCB to the process based on the QoS level assigned to the process. For example, the process may have a QoS level defined based on the instructions, application, or service the process is executing. In one or more embodiments of the invention, when the virtual machine operating system allocates a VCB to a process, the virtual machine operating system identifies the process QoS level. The virtual machine operating system selects the VCB to allocate from the set of VCBs corresponding to the identified QoS level and shared VCBs. If a VCB is not available, then the process waits.

When a VCB is available, the process in the virtual machine sends a command to the requested address of the VCB in Step 705. At this stage, once the command is sent to the VCB, to the process, the command is processed by the host channel adapter. However, the physical resources may not be available on the host channel adapter.

In Step 707 a determination is made about whether a PCB is available to the underlying function QoS level. Specifically, when command data corresponding to a new command is received, the PCB allocator determines, based on the VCB address, whether a PCB is available. For example, the PCB allocator may first check whether a PCB corresponding to the QoS level is available. If a PCB corresponding to the QoS level is not available, then the PCB allocator may check whether a PCB shared amongst the QoS levels for the underlying function corresponding to the virtual machine is available. If a PCB shared amongst the QoS levels for the underlying function is not available, the PCB allocator may check whether a PCB shared amongst the underlying functions is available. Checking whether a PCB is available may be performed by checking a CSR to determine whether the maximum allocated number of PCBs is in use.

In Step 709, if a PCB is available, then PCB is bound to the VCB and the command data is written to the PCB. In one or more embodiments of the invention, the binding means that any subsequent command data written to the VCB for the command is stored in the PCB bound to the VCB. Writing command data until the kick is received may be performed as discussed above with reference to Step 607 in FIG. 6.

Continuing with FIG. 7, if a PCB is not available, then the VCB is marked to be in send queue mode in Step 711. By marking the VCB in send queue mode, the command is set to be later obtained from the send queue.

In Step 713, the queue pair identifier and the send queue sequence number is extracted from the command data and the remaining command data is dropped until the kick is received. Specifically, the remaining command data is ignored. In one or more embodiments of the invention, the queue pair identifier corresponds to the queue pair to which the command is directed. The send queue sequence number provides an identifier of where the command was stored in the send queue in Step 701 (discussed above).

As discussed above, the non-existence of a PCB may be hidden from the process in the virtual machine. Accordingly, the process of the virtual machine may send command data for the entire command to the host channel adapter. However, as discussed above, the remaining command data is dropped in one or more embodiments of the invention. As discussed above, dropping the remaining command data allows the host channel adapter to ignore the remaining command data.

In Step 715, the queue pair identifier and the send queue sequence number is added to the queuing structure in host memory. By adding the queue pair identifier and the send queue sequence number to the queuing structure, the command may be obtained by the send queue scheduler and stored on the host channel adapter. In Step 717, once the kick is received, the VCB is freed. At this stage, the VCB may be used by other processes in the virtual machine.

Figure 8:
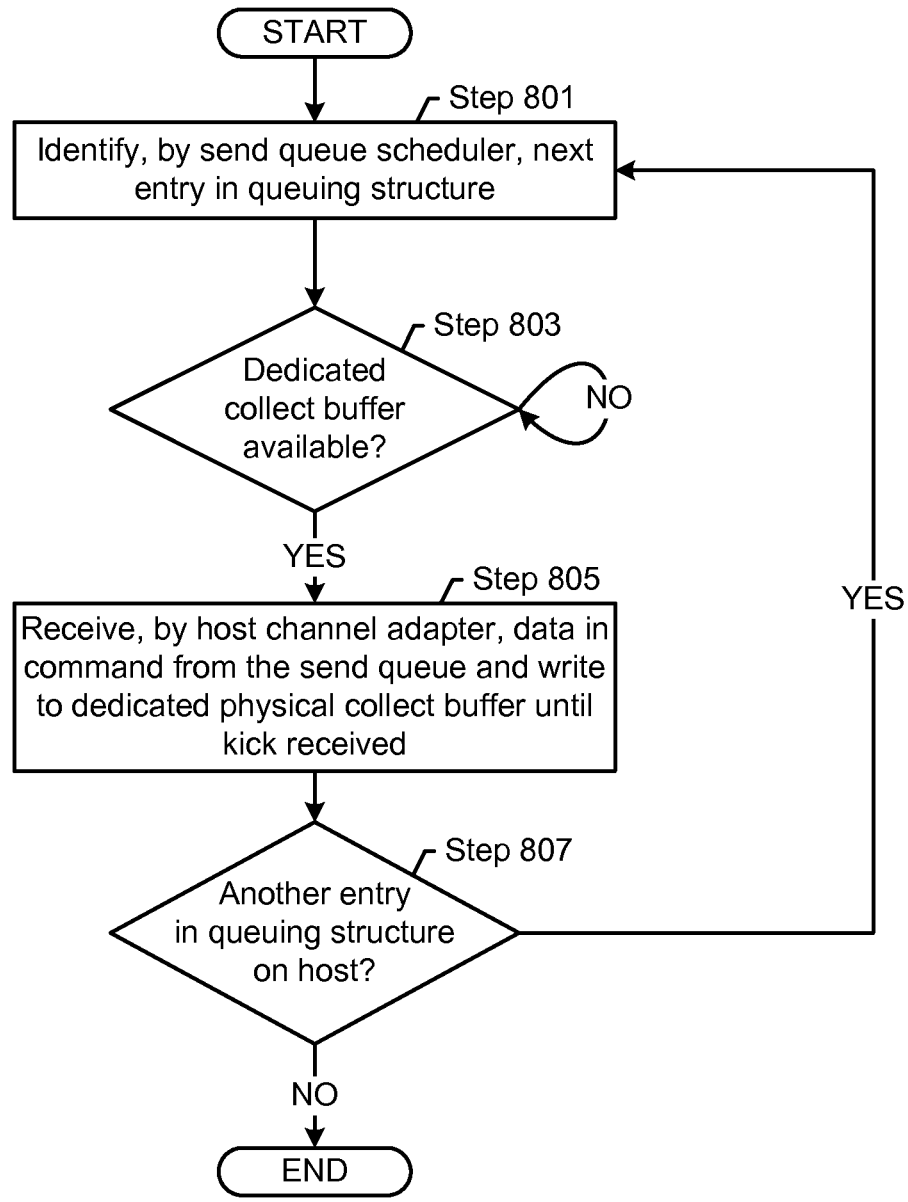

FIG. 8 shows a flowchart for the send queue scheduler to store commands on the host channel adapter in one or more embodiments of the invention. In one or more embodiments of the invention, the send queue scheduler stores commands on the host channel adapter for a process in a virtual machine when a PCB is unavailable to the process in the virtual machine as discussed above and in FIG. 6. Thus, the operations of and the resources used by the send queue scheduler is shared between processes in different virtual machines.

In Step 801, the send queue scheduler identifies the next entry in the queuing structure. In one or more embodiments of the invention, the queuing structure is a first in first out queue. In such embodiments, the next entry in the queuing structure is the oldest entry in the queuing structure.

In Step 803, the send queue scheduler determines whether a dedicated PCB is available. Determining whether a dedicated PCB is available may be performed as discussed above with reference to Step 605 of FIG. 6.

When a dedicated PCB is available, the send queue scheduler obtains the send queue sequence number and the queue pair identifier in the queuing structure. The scheduler requests the command from the send queue location corresponding to the send queue sequence number using the queue pair identifier. When the scheduler requests the command, the command data is transferred to the host channel adapter.

In Step 805, the host channel adapter receives the command data from the send queue and writes the data to the dedicated PCB until the kick is received. Step 805 may be performed in a similar manner as discussed above with reference to Step 607 in FIG. 6.

In Step 807, a determination is made about whether another entry in the queuing structure on the host exists. If another entry exists, then the send queue scheduler continues FIG. 8 to process the next entry in the queuing structure.

Figure 9:
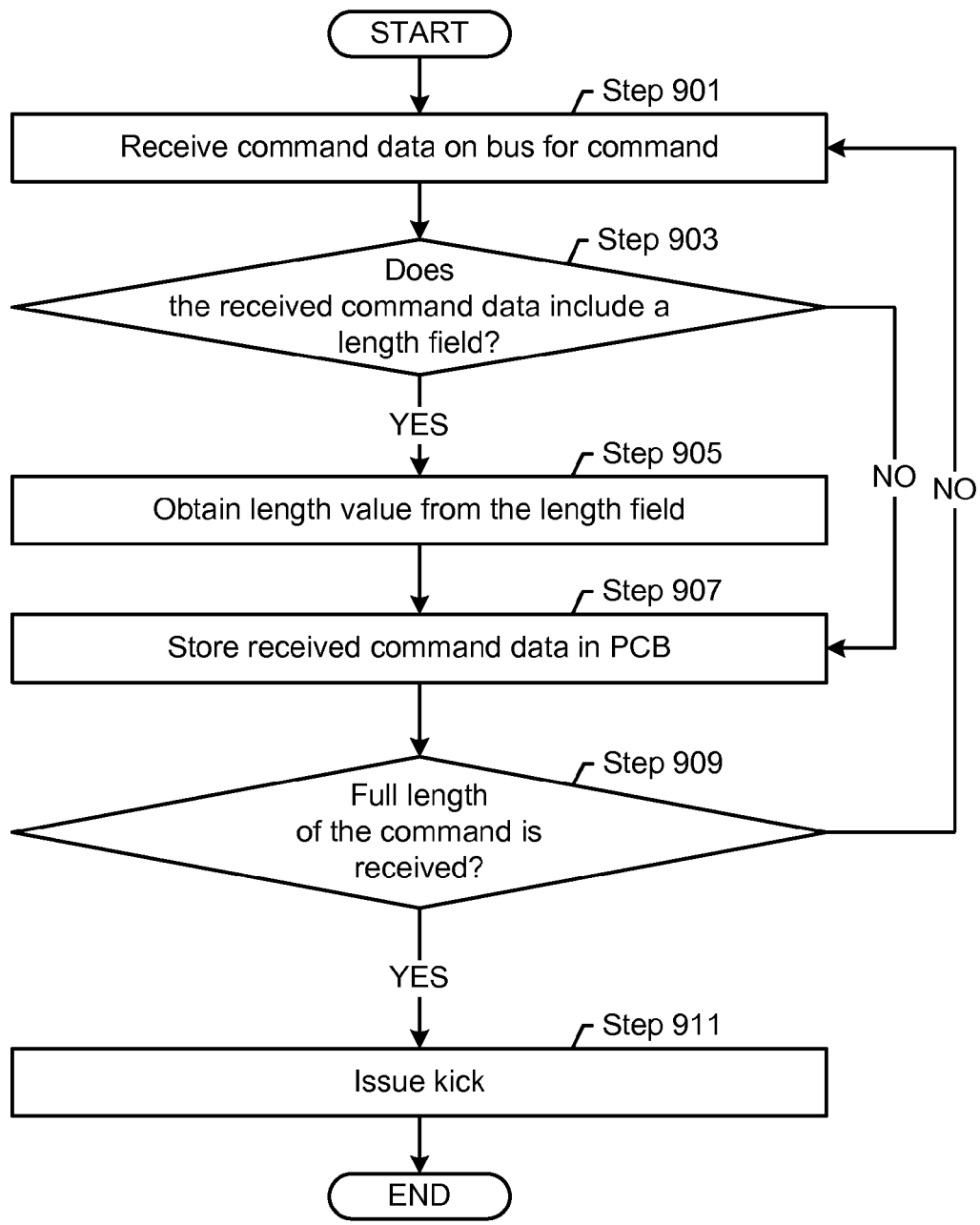

FIG. 9 shows a flowchart for receiving command data until a kick is received in one or more embodiments of the invention. In one or more embodiments of the invention, a kick may be an explicit kick or a virtual kick. An explicit kick is an instruction sent at the end of the command, when all command data is received, that indicates additional command data does not exist. When an explicit kick instruction is received, the host channel adapter may process the explicit kick. Specifically, the host channel adapter may add an identifier of the PCB to the virtual kick list corresponding to the TVL. In contrast to the explicit kicks, in one or more embodiments of the invention, virtual kicks are kicks that are based on a length transmitted in the command data. FIG. 9 shows a flowchart for the host channel adapter to receive commands that use virtual kicks.

In Step 901, command data is received on the PCI express fabric bus. In one or more embodiments of the invention, the command data received is in conformance with a predefined protocol. For example, the predefined protocol may set the position of the address, the type of command, and the length field as well as remaining data in the command. The length field may be defined according to the predefined protocol as being located at a particular portion of the command, such as starting at a particular bit location, or otherwise being specified by the predefined protocol.

In Step 903, a determination is made about whether the received command data includes a length field. Determining whether the received command data includes the length field may be performed using the predefined protocol. In Step 905, if the received command data includes a length field, the length value is obtained from the length field. At this stage, the host channel adapter has information regarding the size of the command.

In Step 907, regardless of whether the received command data includes a length field, the received command data without the length field is stored in the PCB. For example, the received command data is stored in the PCB bound to the VCB to which the command data is addressed.

In Step 909, a determination is made about whether the full length of the command is received. If the received command data, including previously received command data, does not include a length field, then the full length of the command may be determined not to be received. Specifically, because the command includes a length field when virtual kicks are used, the absence of the length field indicates that at least the portion of the command having the length field is not yet received. If all received command data includes a length field, determining whether the full length of the command data is received may be performed by comparing the length value with the amount of the command received.

In one or more embodiments of the invention, the following method may be used to determine whether the full length of the command is received. The length value may be used to create a scoreboard mask. The scoreboard mask is a bit mask has bits that exceed the length preset. A scoreboard is used to track portions of the command data received. The scoreboard may be a series of bits. Each bit represents a position of command data in the command. Specifically, when command data is received, the position of the command data within the command is used to update the scoreboard. When an "or" operation on the scoreboard and the scoreboard mask results in all bits being set, then the determination is made that the full length of the command is received. Other methods may be used to determine whether the full length of the command is received without departing from the invention.

If the full length of the command is not received, then the method may repeat with Step 901 to receive command data for the command on the bus. If the full length of the command is received, then a kick is issued in Step 911 in one or more embodiments of the invention. Issuing a kick may be performed by accessing the TVL mapping table to identify the TVL corresponding to the command. Specifically, from the TVL mapping table the TVL or set of TVLs corresponding to the QoS level and the underlying function is identified. If a set of TVLs are identified, then a TVL may be selected from the set of TVLs, such as by using a load balancing protocol.

The virtual kick list corresponding to the selected TVL is identified and an identifier of the PCB having the command is stored in the virtual kick list. When the identifier of the PCB is in the virtual kick list, the command is deemed ready for processing by the non-blocking pipeline in one or more embodiments of the invention.

Figure 10:
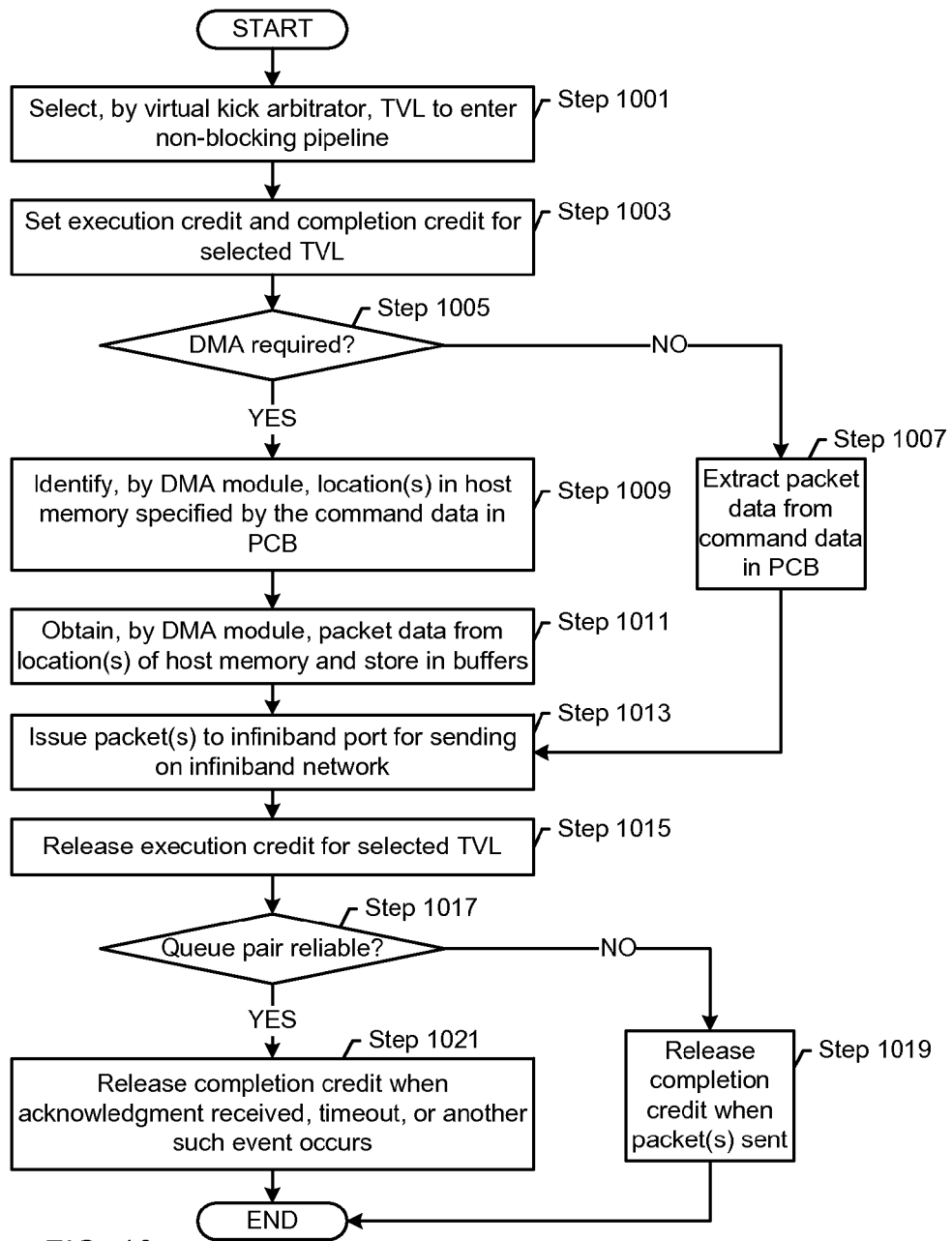

FIG. 10 shows a flowchart for processing the command through a non-blocking pipeline in one or more embodiments of the invention. In Step 1001, the virtual kick arbitrator selects a TVL to enter the non-blocking pipeline. In one or more embodiments of the invention, the virtual kick arbitrator selects the TVL from the set of TVLs having an available execution credit and an available completion credit. The virtual kick arbitrator may select the TVL in accordance with a load balancing protocol. For example, the load balancing protocol may be round robin, weighted round robin, etc.

In Step 1003, the execution credit and completion credits are set for the selected TVL. By setting the execution credit and the completion credit, the execution credit and the completion credit are unavailable for use for processing additional commands. In other words, the TVL is using a portion of the guaranteed resources allocated to the TVL.

In Step 1005, a determination is made about whether DMA is required. In one or more embodiments of the invention, the host channel adapter supports DMA between the host memory and the host channel adapter. For example, command data sent to the host channel adapter may include the packet data for packets to send on the Infiniband® network. In such a scenario, in Step 1007, if DMA is not required, then the packet data is extracted from the command in the PCB.

Alternatively, the command data may specify a location in host memory, such as the location of packet data. If the command data specifies a location in host memory, then DMA is required to obtain the command data. In Step 1009, a DMA module identifies one or more locations in host memory that are specified in the command data in the PCB. In Step 1011, the DMA module obtains the packet data from the one or more locations in host memory and stores the packet data into buffers. In one or more embodiments of the invention, as part of obtaining the packet data, the DMA may perform validation to ensure that the host process sending the command has necessary permissions to obtain the packet data.

In Step 1013, regardless of whether DMA is performed to obtain the packet data, the packets are issue to the Infiniband® port for sending on the Infiniband® network. In particular packets are generated from the packet data. The generating of the packets may include performing various levels of identification and validation, such as validating the send queue sending the packet(s) and the receive queue receiving the packet(s).

In Step 1015, after the packet(s) are sent on the Infiniband® port, the execution credit for the selected TVL is released. Releasing the execution credit releases the execution credit to allow another command to be processed. If the allocated number of completion credits exceeds the allocated number of execution credits, then, at this stage, another command may be processed for the selected TVL once reselected by the virtual kick arbitrator.

In Step 1017, a determination is made about whether the queue pair is reliable. A queue pair is set in reliable or unreliable mode. If the queue pair is in reliable mode, then when the receiving channel adapter having the receive queue receives the packet, the receiving channel adapter responds with an acknowledgement. If the queue pair is in unreliable mode, then the receiving channel adapter does not respond with an acknowledgement.

On the host channel adapter, if the queue pair is unreliable mode, the completion credit is released when the packet(s) is sent in Step 1019. Similar to Releasing the execution credit, releasing the completion credit releases the completion credit to allow another command to be processed. If the queue pair is in reliable mode, then the packets are placed in a completion linked list queue on the host channel adapter. Further, the host channel adapter waits until a timeout occurs, an acknowledgement is received, or a transmission failure is received in one or more embodiments of the invention.

In Step 1021, the completion credit is released when the acknowledgment is received, the timeout occurs, or another such event occurs. In one or more embodiments of the invention, the releasing of the completion credit corresponds with the removal of the packets from the completion linked list queue. In one or more embodiments of the invention, the removal allows for additional packets to be stored in the packet queue.

Figure 11:
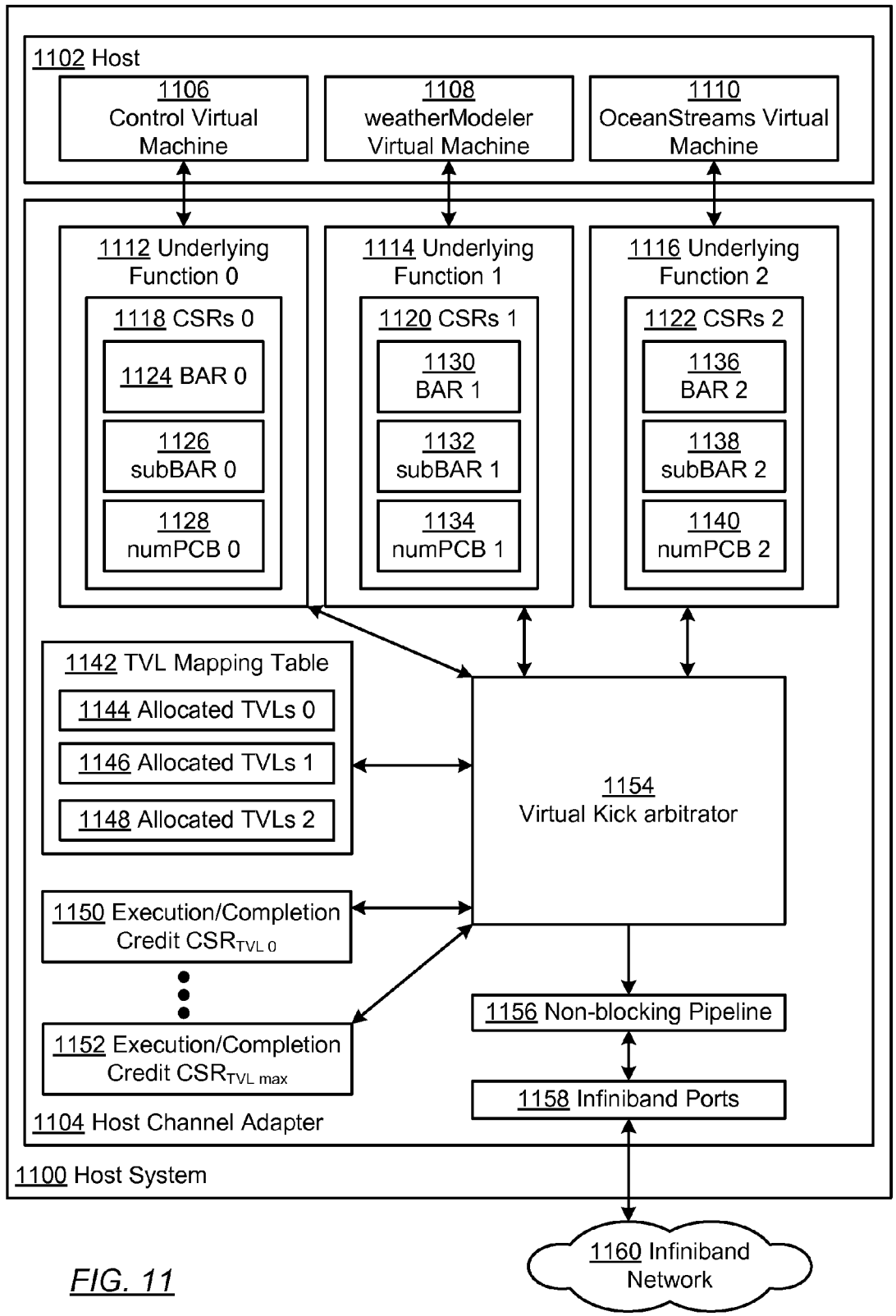
FIG. 11 shows an example in one or more embodiments of the invention.

FIG. 11 shows an example in one or more embodiments of the invention. The following example is for explanatory purposes only and not intended to limit the scope of the invention. In the following example, consider the scenario in which the host system (1100) has a host (1102) and a host channel adapter (1104). The host (1102) executes a control virtual machine (1106), a guest virtual machine for executing the applications of a company called weatherModeler (i.e., weatherModeler virtual machine (1108)), and a guest virtual machine for executing the applications of a company called OceanStreams (i.e., OceanStreams virtual machine (1110)).

Because weatherModeler has paid more than OceanStreams to have a higher service level for executing applications, the control virtual machine sets the resources on the host channel adapter (1104) to give weatherModeler more resources. Specifically, the virtual machine manager sets the value of the BAR for underlying function 1 corresponding to weatherModeler to allocate 25 VCBs to weatherModeler. Specifically, the virtual machine manager sets the value of the CSRs 1 (1120) of underlying function 1 (1114) corresponding to weatherModeler virtual machine (1108). The BAR 1 (1130) is set to allocate 25 VCBs, and the numPCB register 1 (1134) is set to allocate 20 PCBs to the underlying function 1 (1114). The CSRs 2 (1122) of underlying function 2 (1116) are set to allocate resources to OceanStreams virtual machine (1110). The BAR 2 (1136) is set to allocate 15 VCBs, and the numPCB register 2 (1140) is set to allocate 12 PCBs to the underlying function 2 (1116).

Additionally, the virtual machine manager sets the underlying function 0 (1112) CSRs (1118) to allocate resources to the control virtual machine (1106). Specifically, the BAR 0 (1124) is set to allocate 30 VCBs, and the numPCB register 0 (1128) is set to allocate 25 PCBs to the underlying function 0 (1112).

Continuing with the example, the virtual machine manager may set the TVL mapping table (1142) to map a set having 10 TVLs (allocated TVLs 0 (1144)) to underlying function 0 (1112), a set having 20 TVLs (allocated TVLs 1 (1146)) to underlying function 1 (1114), and a set having 15 TVLs (allocated TVLs 2 (1148)) to underlying function 2 (1116). Each TVL is further allocated a set of execution and completion credits in the corresponding TVLs execution and completion credit CSL (e.g., execution and completion credit $CSR_{TVL0}$ (1150), execution and completion credit $CSR_{TVLMax}$ (1152)).

Within each virtual machine, the virtual machine operating system may sub-allocate resources. For example, the control virtual machine may sub-allocate resources by changing the subBAR 0 register (1126) to give more resources to management software. The weatherModeler company may desire to give applications that generate weather alerts more resources. Accordingly, the weatherModeler virtual machine operating system may suballocate the 25 VCBs using the subBAR 1 (1132) by allocating 15 VCBs to the QoS level assigned to weather alerts and 10 VCBs to the QoS level assigned to other applications. Additionally, the weatherModeler virtual machine operating system may also suballocate the set of TVLs and the number of allocated PCBs in a similar manner.

Continuing with the example, the OceanStreams company may desire to give applications belonging to a famous prized researcher more resources. Accordingly, the OceanStreams virtual machine operating system may suballocate the 15 VCBs using the subBAR 2 (1138) by allocating 10 VCBs to the QoS level of applications of the famous prized researcher and 5 VCBs to the QoS level assigned to other applications. Additionally, the OceanStreams virtual machine operating system may also suballocate the set of TVLs and the number of allocated PCBs in a similar manner.

As discussed above, requests on the host channel adapter are processed according to the amount of resources available that are allocated to the underlying function QoS level and that are shared. Thus, when a command from a weather alert application is received, if the weather alert application has not exceeded the 15 VCBs or the number of PCBs, the command can be sent quickly to the host channel adapter. Further, if the transmit corresponding to the weather alert application are not flooded with traffic from the weather alert application, then after the virtual kick arbitrator (1154) places the command on the non-blocking pipeline (1156), the command may be quickly processed and packets issued to the Infiniband® ports (1158) for sending on the Infiniband® network (1160).

As shown by way of the example, embodiments of the invention provide a mechanism for allocating different amounts of host channel adapter resources to different virtual machines. Each virtual machine may then sub-allocate the host channel adapter resources in order to support different QoS levels.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for allocating resources of a host channel adapter, comprising:
   receiving, by the host channel adapter from a virtual machine manager on a host, a first resource allocation request;
   identifying, by the host channel adapter, an underlying function referenced in the first resource allocation request, wherein the underlying function corresponds to a single virtual machine located on the host;
   determining, by the host channel adapter, that the first resource allocation request specifies a number of physical collect buffers (PCBs) allocated to the underlying function;
   allocating, by the host channel adapter, the number of PCBs to the underlying function by storing the number in a control and status register (CSR);
   determining, by the host channel adapter, that the first resource allocation request specifies a number of virtual collect buffers (VCBs) allocated to the underlying function;
   allocating, by the host channel adapter, the number of VCBs to the underlying function by storing a base address register (BAR) in the CSR;
   receiving, by the host channel adapter, first command data for a first command from the single virtual machine for sending packets on a network, wherein the first command data specifies an address of a VCB of the number of VCBs allocated to the single virtual machine;
   determining, using the CSR, that the underlying function has in use at least the number of PCBs when the first command data is received; and
   dropping the first command data in the first command based on the underlying function having in use at least the number of PCBs.

2. The method of claim 1, wherein, prior to dropping the first command data, the first command data is stored in a send queue located on the host, and wherein the method further comprises:
   iterating, by the host channel adapter, through the send queue;
   obtaining, by the host channel adapter, the first command data from the send queue after dropping the first command data;
   storing, by the host channel adapter, the first command data in a dedicated PCB;
   executing the first command in a pipeline in order to obtain packet data; and
   sending, by the host channel adapter, the packet data on the network.

3. The method of claim 1, further comprising:
   receiving, by the host channel adapter, second command data for a second command from the single virtual machine for sending packets on the network;
   determining, using the CSR, that the underlying function has an available PCB when the second command data is received; and
   storing the second command data in the available PCB.

4. The method of claim 3, further comprising:
   receiving, by the host channel adapter from the virtual machine manager, a second resource allocation request;
   identifying, by the host channel adapter, the underlying function referenced in the second resource allocation request;
   determining, by the host channel adapter, that the second resource allocation request specifies a number of transport specific unit virtual lanes (TVLs) to allocate to the underlying function; and
   updating a mapping table based on the number of TVLs to allocate number of TVLs to the underlying function.

5. The method of claim 4, further comprising:
   referencing the available PCB in a virtual kick list corresponding to a transport specific unit virtual lane (TVL) of the number of TVLs when the entirety of the second command is received;
   obtaining the second command from the virtual kick list;
   executing the second command in a pipeline in order to obtain packet data using the second command data; and
   sending, by the host channel adapter, the packet data on the network.

6. The method of claim 5, further comprising:
   receiving, by the host channel adapter from the virtual machine manager, a third resource allocation request;

identifying, by the host channel adapter, the TVL referenced in the third resource allocation request;
determining, by the host channel adapter, that the third resource allocation request specifies a number of execution credits to allocate to the TVL; and
storing, by the host channel adapter, the number of execution credits,
wherein executing the second command comprises:
when an execution credit of the number of execution credits is available:
setting the execution credit;
obtaining the packet data using the second command data; and
releasing the execution credit after the packet data is obtained.

7. The method of claim 6, wherein the packet data is obtained directly from the command data.

8. The method of claim 6, wherein the packet data is obtained by performing direct memory access (DMA) from memory on the host using a location specified by the command data.

9. The method of claim 6, further comprising:
receiving, by the host channel adapter from the virtual machine manager, a fourth resource allocation request;
identifying, by the host channel adapter, the TVL referenced in the fourth resource allocation request;
determining, by the host channel adapter, that the fourth resource allocation request specifies a number of completion credits to allocate to the TVL; and
storing, by the host channel adapter, the number of completion credits,
wherein sending the second command comprises:
when a completion credit of the number of completion credits is available:
setting the completion credit;
sending the packet data on the network; and
releasing the completion credit after the packet data is sent.

10. A host channel adapter comprising:
a plurality of physical collect buffers (PCBs);
a first control and status register (CSR) corresponding to a first underlying function, wherein the first underlying function corresponds to a first virtual machine;
a second CSR corresponding to a second underlying function, wherein the second underlying function corresponding to a second virtual machine;
a service processor resource manager operatively connected to the first CSR and the second CSR and configured to:
receive, from a virtual machine manager on a host, a first resource allocation request;
identify the first underlying function referenced in the first resource allocation request;
determine that the first resource allocation request specifies a first number of PCBs allocated to the first underlying function;
allocate the first number of PCBs to the first underlying function by storing the first number in the first CSR;
determine that the first resource allocation request specifies a first number of virtual collect buffers (VCBs) allocated to the first underlying function;
allocate the first number of VCBs to the first underlying function by storing a base address register (BAR) in the CSR;
receive, from the virtual machine manager on a host, a second resource allocation request;
identify the second underlying function referenced in the second resource allocation request;
determine that the second resource allocation request specifies a second number of PCBs allocated to the second underlying function; and
allocate the second number of PCBs to the second underlying function by storing the second number in the second CSR; and
a PCB allocator configured to:
receive first command data for a first command from the first virtual machine for sending packets on an network, wherein the first command data specifies an address of a VCB of the first number of VCBs;
determine, using the CSR, that the underlying function has in use at least the number of PCBs when the first command data is received; and
drop the first command data in the first command based on the underlying function having in use at least the number of PCBs.

11. The host channel adapter of claim 10, further comprising:
a dedicated PCB; and
a send queue scheduler configured to transfer command data from a send queue located on a host to the dedicated PCB.

12. The host channel adapter of claim 10, further comprising:
a pipeline configured to execute commands.

13. The host channel adapter of claim 10, further comprising:
a virtual kick list for storing identifiers of PCBs comprising complete commands.

14. The host channel adapter of claim 10, further comprising:
a pipeline connected to the virtual kick list and configured to:
execute commands in order to obtain packet data; and
a port configured to:
send the packet data on the network.

15. The host channel adapter of claim 14, further comprising:
a mapping table comprising a mapping between underlying functions and transport specific unit virtual lanes (TVLs), wherein each underlying function is allocated a number of TVLs.

16. The host channel adapter of claim 15, further comprising:
a execution and completion credit CSR for each TVL, wherein the execution and completion credit CSR is configured to store a number of execution credits and a number of completion credits defining a number of commands processed for a corresponding TVL at a time.

17. A system comprising:
a host comprising:
a virtual machine manager configured to send a first resource allocation request and a second resource allocation request;
a first virtual machine; and
a second virtual machine; and
a host channel adapter operatively connected to the host and comprising:
a plurality of physical collect buffers (PCBs);
a first control and status register (CSR) corresponding to a first underlying function, wherein the first underlying function corresponds to the first virtual machine;

a second CSR corresponding to a second underlying function, wherein the second underlying function corresponding to the second virtual machine;
a service processor resource manager configured to:
  receive the first resource allocation request;
  identify the first underlying function referenced in the first resource allocation request;
  determine that the first resource allocation request specifies a first number of PCBs allocated to the first underlying function;
  allocate the first number of PCBs to the first underlying function by storing the first number in the first CSR;
  determine that the first resource allocation request specifies a first number of virtual collect buffers (VCBs) allocated to the first underlying function;
  allocate the first number of VCBs to the first underlying function by storing a base address register (BAR) in the CSR;
  receive the second resource allocation request;
  identify the second underlying function referenced in the second resource allocation request;
  determine that the second resource allocation request specifies a second number of PCBs allocated to the second underlying function; and
  allocate the second number of PCBs to the second underlying function by storing the second number in the second CSR; and a PCB allocator configured to:
  receive first command data for a first command from the first virtual machine for sending packets on a network, wherein the first command data specifies an address of a VCB of the first number of VCBs;
  determine, using the CSR, that the underlying function has in use at least the number of PCBs when the first command data is received; and
  drop the first command data in the first command based on the underlying function having in use at least the number of PCBs.

18. The system of claim 17, wherein the host further comprises:
  a send queue configured to store the first command data; and
  a queuing structure configured to store an address of the send queue after the first command data is dropped.

19. The system of claim 18, wherein the host channel adapter further comprises:
  a send queue scheduler configured to:
    iterate through the queuing structure;
    identify, after the first command data is dropped, the send queue from an entry in the queuing structure while iterating through the queuing structure; and
    initiate transmission of the first command data from the send queue to the host channel adapter.

20. The system of claim 19, wherein the plurality of PCBs comprises:
  a dedicated PCB for the send queue scheduler.

* * * * *

UNITED STATES PATENT AND TRADEMARK OFFICE
CERTIFICATE OF CORRECTION

PATENT NO. : 8,484,392 B2
APPLICATION NO. : 13/149449
DATED : July 9, 2013
INVENTOR(S) : Manula et al.

Page 1 of 1

It is certified that error appears in the above-identified patent and that said Letters Patent is hereby corrected as shown below:

On Title page, column 1, item (75), under Inventors, delete "Oslo (OA);" and insert -- Oslo (NO); --, therefor.

In the Specification

In column 8, line 60, delete "acknowlegement" and insert -- acknowledgement --, therefor.

In column 10, line 39, delete "may used" and insert -- may be used --, therefor.

Signed and Sealed this
Twenty-ninth Day of October, 2013

Teresa Stanek Rea
*Deputy Director of the United States Patent and Trademark Office*